United States Patent
Morishita et al.

(10) Patent No.: US 12,085,057 B2
(45) Date of Patent: Sep. 10, 2024

(54) SUPPORT STRUCTURE FOR WIND POWER GENERATION DEVICE AND WIND POWER GENERATION DEVICE

(71) Applicant: MITSUBISHI HEAVY INDUSTRIES, LTD., Tokyo (JP)

(72) Inventors: Kunihiro Morishita, Tokyo (JP); Motoki Kato, Tokyo (JP); Tadashi Sugimura, Tokyo (JP); Atsushi Yuge, Tokyo (JP); Kai Karikomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 210 days.

(21) Appl. No.: 17/774,236

(22) PCT Filed: Nov. 11, 2020

(86) PCT No.: PCT/JP2020/042002
§ 371 (c)(1),
(2) Date: May 4, 2022

(87) PCT Pub. No.: WO2021/106560
PCT Pub. Date: Jun. 3, 2021

(65) Prior Publication Data
US 2022/0381226 A1 Dec. 1, 2022

(30) Foreign Application Priority Data
Nov. 26, 2019 (JP) .................. 2019-213415

(51) Int. Cl.
*F03D 13/25* (2016.01)
*H02K 7/18* (2006.01)

(52) U.S. Cl.
CPC .......... *F03D 13/25* (2016.05); *H02K 7/1838* (2013.01); *F05B 2240/93* (2013.01); *F05B 2240/95* (2013.01)

(58) Field of Classification Search
CPC .......... F03D 13/256; F03D 13/20; F03D 9/30; E02B 2017/0091; B63B 2035/442; B63B 2035/446; H02K 7/1838; Y02E 10/727
(Continued)

(56) References Cited

U.S. PATENT DOCUMENTS

2011/0214596 A1* 9/2011 Wang ...................... B63B 21/60
114/265
2015/0329180 A1 11/2015 Tominaga
(Continued)

FOREIGN PATENT DOCUMENTS

CN 104884794 9/2015
CN 109322780 2/2019
(Continued)

OTHER PUBLICATIONS

Extended European Search Report issued Oct. 14, 2022 in corresponding European Patent Application No. 20894347.2.
(Continued)

*Primary Examiner* — Brian E Glessner
*Assistant Examiner* — Adam G Barlow
(74) *Attorney, Agent, or Firm* — Wenderoth, Lind & Ponack, L.L.P.

(57) ABSTRACT

A support structure for a wind power generation device comprises: a plurality of floats that can float on the surface of water or in the water; a connecting member having one end connected to one of the floats and the other end connected to another of the floats among the plurality of floats; a support platform that is provided between the plurality of floats and supports the bottom end of a tower part of the wind power generation device; a linear wire member having one end connected to one of the floats and the other end connected to the support platform; and a support member that is provided on the floats or on the
(Continued)

connecting member and supports the tower part, which is supported on the support platform, from a lateral direction while the support member being movable along the axial direction of the tower part.

12 Claims, 24 Drawing Sheets

(58) Field of Classification Search
USPC .............................. 52/167.6, 167.8; 405/196
See application file for complete search history.

(56) References Cited

U.S. PATENT DOCUMENTS

| | | | |
|---|---|---|---|
| 2018/0170488 A1 | 6/2018 | Fernandez Gomez et al. | |
| 2019/0078556 A1* | 3/2019 | Stiesdal | B63B 21/502 |
| 2020/0040541 A1* | 2/2020 | Van Der Tempel | E04H 12/085 |
| 2023/0159141 A1* | 5/2023 | Viselli | B63B 77/10 |
| | | | 114/122 |
| 2023/0160368 A1* | 5/2023 | Ludwigsson | B63B 1/107 |
| | | | 290/55 |
| 2023/0219661 A1* | 7/2023 | Runge | B63B 39/03 |
| 2023/0257072 A1* | 8/2023 | Ohta | F03D 13/25 |
| | | | 114/125 |
| 2023/0271679 A1* | 8/2023 | Esbensen | F03D 13/40 |
| | | | 114/121 |
| 2023/0382495 A1* | 11/2023 | Lackner | F03D 9/19 |

FOREIGN PATENT DOCUMENTS

| | | | |
|---|---|---|---|
| CN | 109322780 A * | 2/2019 | .......... F03B 13/1875 |
| CN | 208564867 | 3/2019 | |
| EP | 2 499 364 | 1/2014 | |
| GB | 2538329 | 11/2016 | |
| JP | 2005-180351 | 7/2005 | |
| JP | 2007-263077 | 10/2007 | |
| JP | 5758501 | 8/2015 | |
| JP | 2016-141983 | 8/2016 | |
| JP | 6336436 | 6/2018 | |
| WO | 2013/155521 | 10/2013 | |
| WO | 2016/079540 | 5/2016 | |
| WO | WO-2016079540 A1 * | 5/2016 | ............. B63B 1/048 |

OTHER PUBLICATIONS

International Search Report issued Jan. 19, 2021 in corresponding International (PCT) Patent Application No. PCT/JP2020/042002, with English translation.
Written Opinion of the International Searching Authority issued Jan. 19, 2021 in corresponding International (PCT) Patent Application No. PCT/JP2020/042002, with English translation.

* cited by examiner

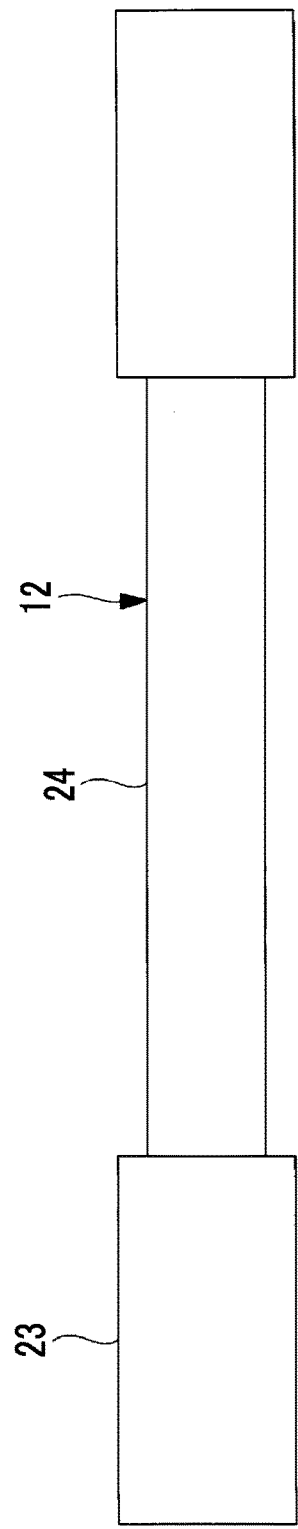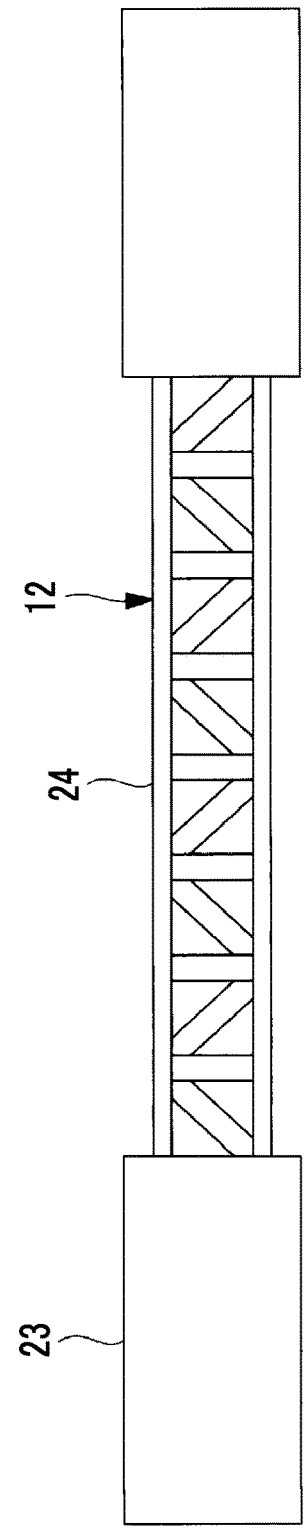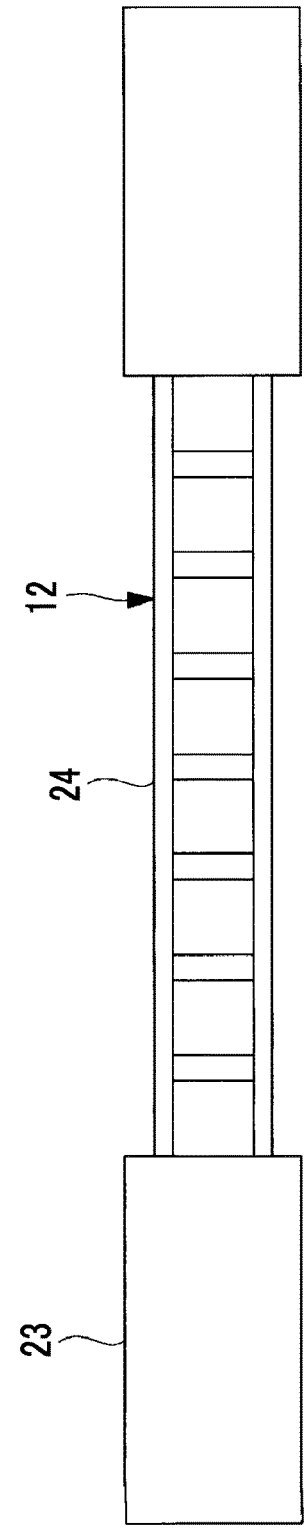

SUPPORT STRUCTURE FOR WIND POWER GENERATION DEVICE AND WIND POWER GENERATION DEVICE

TECHNICAL FIELD

The present disclosure relates to a support structure for a wind power generation device and a wind power generation device.

BACKGROUND ART

As an offshore wind power generation device, there is a fixed-bottom type in which a foundation of a tower part is buried in the seabed, or a floating type in which a tower part is floated and balanced by buoyancy on the ocean, or the like. As disclosed in PTL 1, the floating type wind power generation device includes a tower part to which a wind turbine part is installed, and a foundation (a buoyancy part) that supports the tower part. There is a case where the buoyancy part includes, for example, three outer columns, one center column, a top beam connecting the upper portion of each of the columns, a bottom beam connecting the lower portion of each of the columns, and a strut connecting the upper portion of the center column and the lower portion of the outer column (for example, FIG. 22 of PTL 1).

Further, PTL 2 also discloses a floating type wind power generation device including a center column, a plurality of buoyancy elements disposed in a radial direction thereof, and a strut connecting the center column and the buoyancy element.

CITATION LIST

Patent Literature

[PTL 1] Japanese Patent No. 6336436
[PTL 2] UK Patent Application Publication No. 2538329

SUMMARY OF INVENTION

Technical Problem

The foundation (the buoyancy part) shown in PTL 1 is manufactured by a construction method in which a plurality of components are individually manufactured and then the components are assembled. Each of the outer column, the center column, the top beam, the bottom beam, and the strut is composed of a plurality of components, and in this construction method, it is necessary to install scaffolding with respect to each component, and the number of transportations by a crane or the like is also large. Therefore, there is a problem in that the construction man-hour increases and the time and effort required for the construction becomes large. Further, since the tower part and the buoyancy part, and the components of the buoyancy part are required to be connected to each other by rigid joining, a joining member becomes large in order to secure the strength of a joint portion. Further, the buoyancy part is assembled on a barge installed on the ocean. However, the buoyancy part of a finished product in which components are joined to each other has a considerable area, and therefore, it is necessary to prepare a large barge.

Further, also in the buoyancy part in PTL 2, the strut connecting the center column and the buoyancy element is connected to each component by rigid joining. Further, a tubular portion, which is provided at the lower portion of the tower part, and the center column are fixed to each other through grout that is filled between the inside of the center column and the outside of the tubular portion. Therefore, a large load is transferred from the tower part side to the strut diagonally disposed between the upper portion of the center column and the buoyancy element. Therefore, the strut is required to have a proof stress such that buckling does not occur.

The present disclosure has been made in view of such circumstances, and has an object to provide a support structure for a wind power generation device and a wind power generation device, in which it is possible to simplify a joint portion between members.

Solution to Problem

In order to solve the above problems, a support structure for a wind power generation device and a wind power generation device of the present disclosure adopt the following means.

That is, the support structure for a wind power generation device according to the present disclosure includes: a plurality of floats capable of floating on a water surface or in water; a connecting member having one end connected to one float among the plurality of floats and the other end connected to another float among the plurality of floats; a support platform that is provided in a middle of the plurality of floats and supports a lower end of a tower part of the wind power generation device; a linear wire member having one end connected to the float or the connecting member and the other end connected to the support platform; and a support member that is provided at the float or the connecting member and supports the tower part, supported on the support platform from a side such that the tower part is movable in an axial direction of the tower part.

The wind power generation device according to the present disclosure includes the support structure for a wind power generation device described above.

Advantageous Effects of Invention

According to the present disclosure, it is possible to simplify a joint portion between members and reduce the time and cost required for manufacturing.

BRIEF DESCRIPTION OF DRAWINGS

FIGS. 18A to 18C are side views showing the support structure according to the embodiment of the present disclosure, and side views as viewed from the direction of an arrow B of FIG. 7.

DESCRIPTION OF EMBODIMENTS

Hereinafter, a wind power generation device 1 according to an embodiment of the present disclosure will be described with reference to the drawings.

Figure 1:
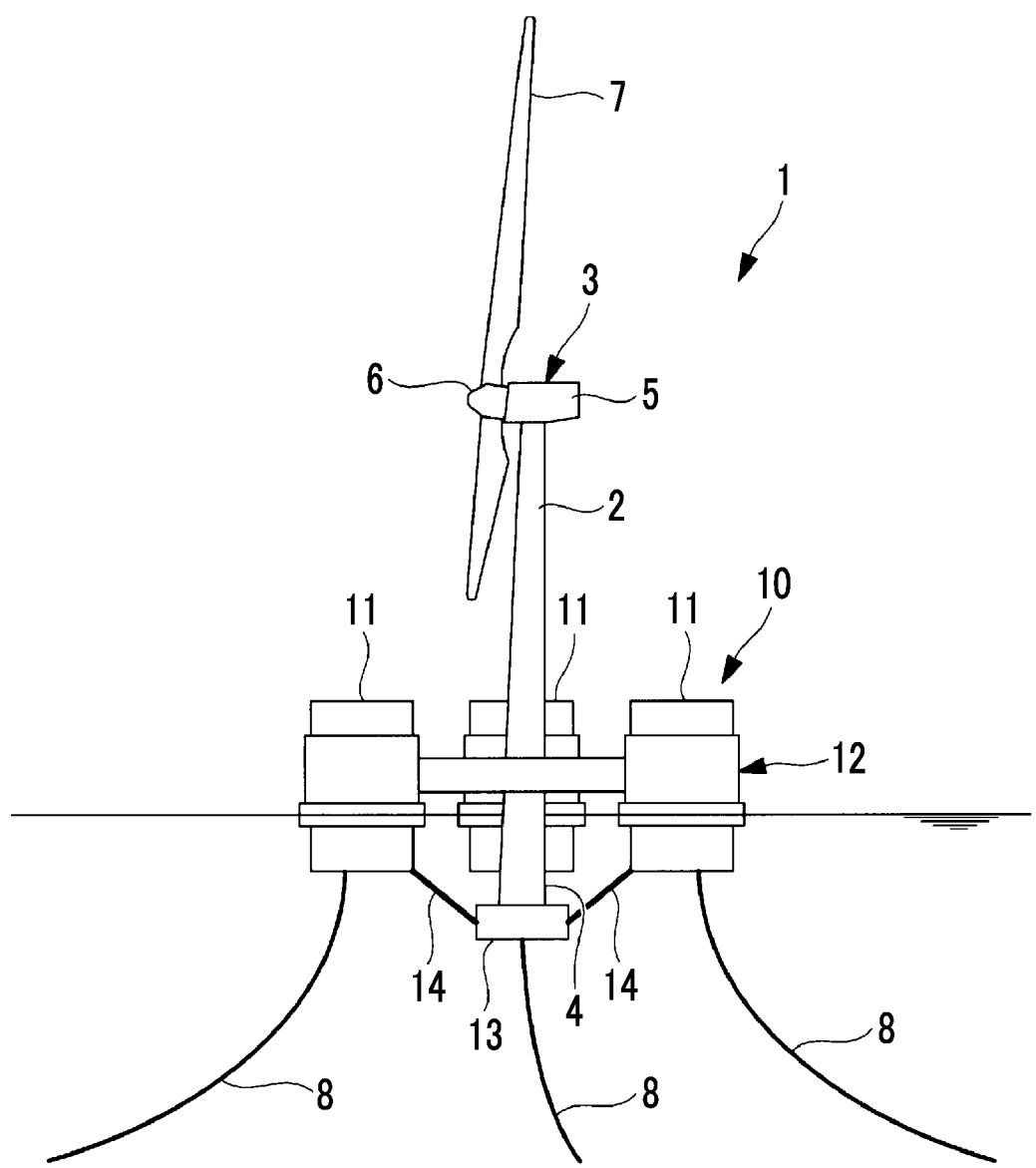
FIG. 1 is a side view showing a wind power generation device according to an embodiment of the present disclosure.

As shown in FIG. 1, the wind power generation device according to an embodiment of the present disclosure includes one tower part 2, a wind turbine part 3 installed at the tower part 2, a support structure 10 that supports the tower part 2 on the ocean, and the like. The wind power generation device 1 is grid-connected in order to transmit the generated electric power to an electric power system. The wind power generation device 1 is a floating type and is installed on the ocean by the support structure 10 floated on a water surface or in water. The support structure 10 is moored to the seabed by an anchor cable 8. One end of the anchor cable 8 is fixed to the seabed, and the other end is connected to the support structure 10.

The tower part 2 has a structure that is long in one direction, and a foundation part 4 of the tower part 2 is provided at the support structure 10 such that an axial direction thereof is a direction perpendicular to an installation surface. The tower part 2 may be, for example, a single columnar member or may be configured by combining a plurality of long members.

The tower part 2 supports the wind turbine part 3 on the upper end side. The tower part 2 is composed of a long member or the like, which mainly bears a compressive force and bending.

The wind turbine part 3 installed to the tower part includes a nacelle 5, a rotor and a generator accommodated in the nacelle 5, a rotor head 6 installed at the tip of the rotor, a plurality of (for example, three) blades 7 provided at the rotor head 6, and the like.

The nacelle 5 is installed at the upper portion of the tower part 2 and includes a rotor, a gear box, a generator, and the like inside. The rotor head 6 is provided on one end side of the nacelle 5. The rotor is rotatable around a substantially horizontal axis. One end side of the rotor is connected to the rotor head 6, and the other end side of the rotor is, for example, directly connected to the generator or is connected to the generator through the gear box or a hydraulic pump/hydraulic motor. The generator is driven by a rotational force that is generated by the rotation of the rotor around an axis to generate electricity.

A plurality of blades 7 are radially mounted to the rotor head 6. The plurality of blades 7 are rotated with the rotor as the center by receiving the wind. The blade 7 is connected to the rotor head 6 through a turning wheel bearing for pitch control, and is rotatable around a blade axis extending in a blade length direction. In this way, the pitch angle of the blade 7 is adjusted.

The nacelle 5 turns with respect to the tower part 2 on a substantially horizontal plane to cause the direction of the rotor head 6 to be aligned with the wind direction, and causes the rotating surface of the blade 7 to face the wind direction. The turning of the nacelle 5 on the substantially horizontal plane is called yaw turning. The nacelle 5 turns through a yaw turning wheel bearing connected to the nacelle 5 and the tower part 2.

According to the present embodiment, the wind turbine part 3 has the rotor, the blade 7 provided at the rotor, and the generator that generates electricity by the rotational force of the rotor, and the wind turbine part 3 is supported by the tower part 2. The wind turbine part 3 is rotated by receiving the wind to generate electricity.

Next, the support structure 10 for the wind power generation device 1 according to the present embodiment will be described.

Figure 2:
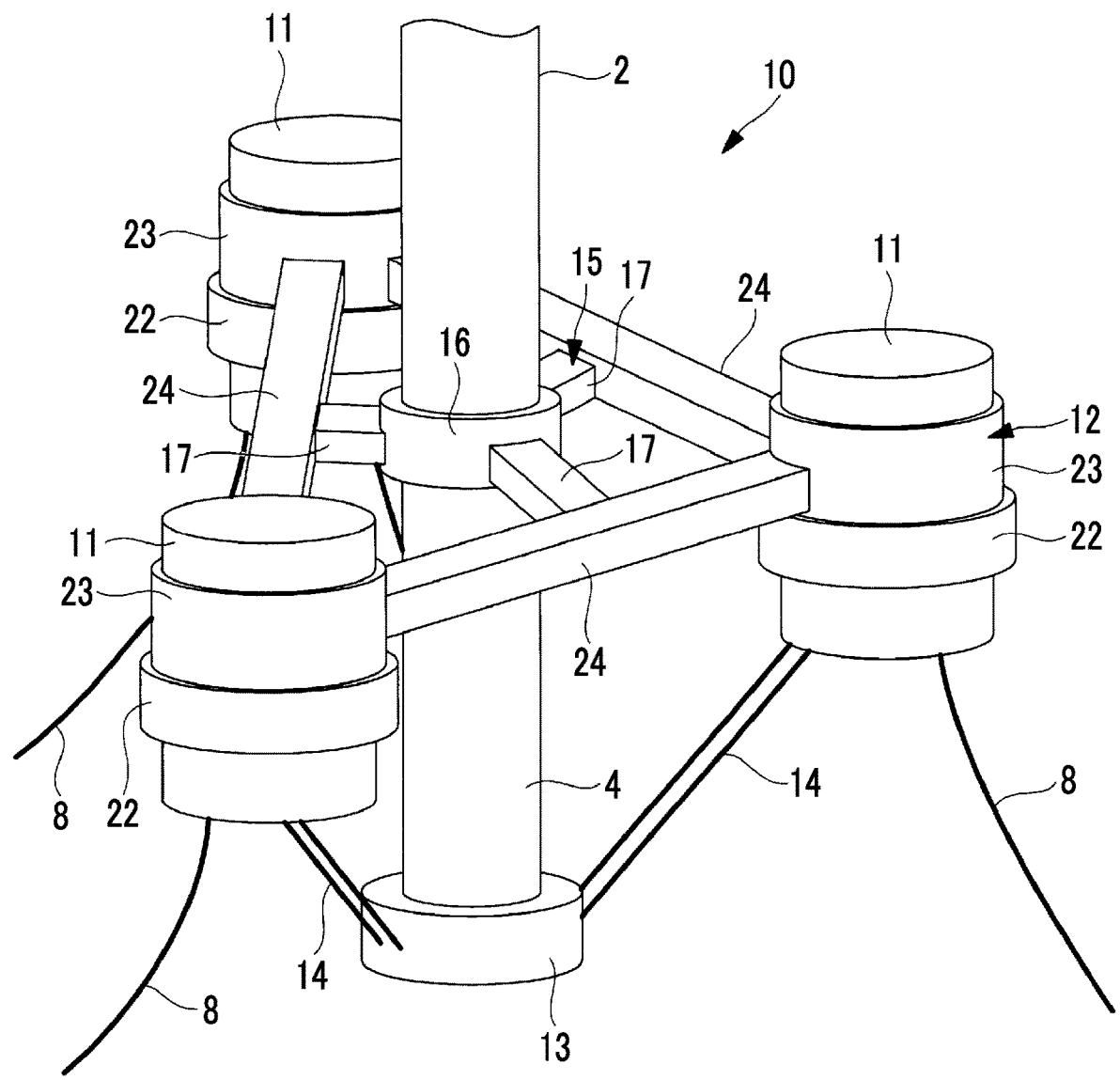
FIG. 2 is a perspective view showing a support structure for a wind power generation device according to the embodiment of the present disclosure.

As shown in FIG. 2, the support structure 10 includes a plurality of floats (pontoons) 11, a connecting member 12, a support platform 13, a wire member 14, a support member 15, and the like.

Figure 3:
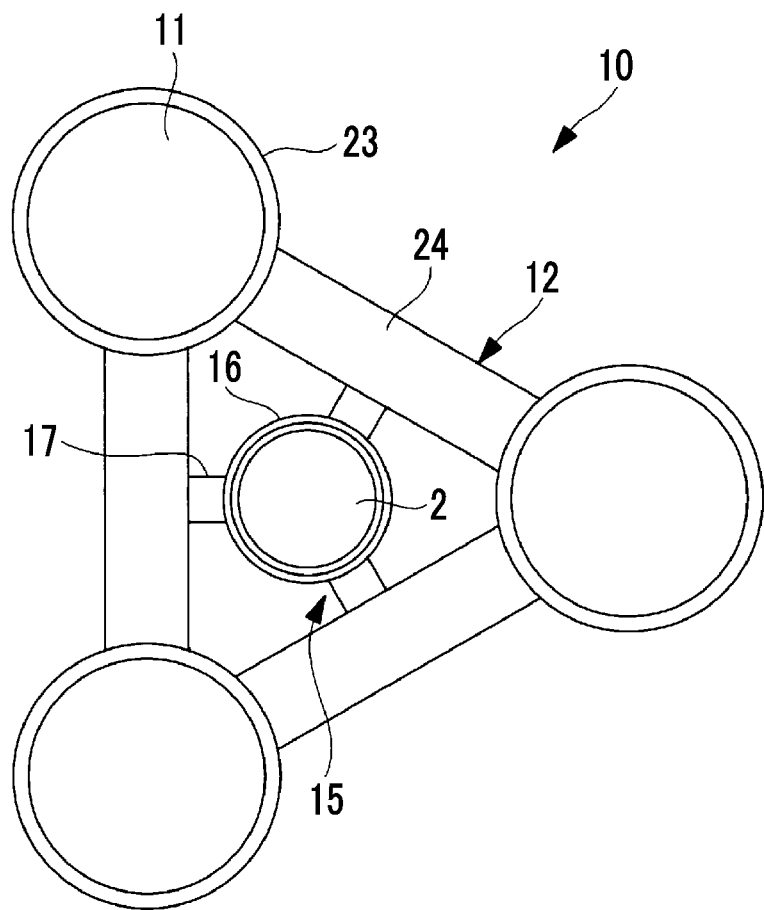
FIG. 3 is a plan view showing the support structure for a wind power generation device according to the embodiment of the present disclosure.
Figure 4:
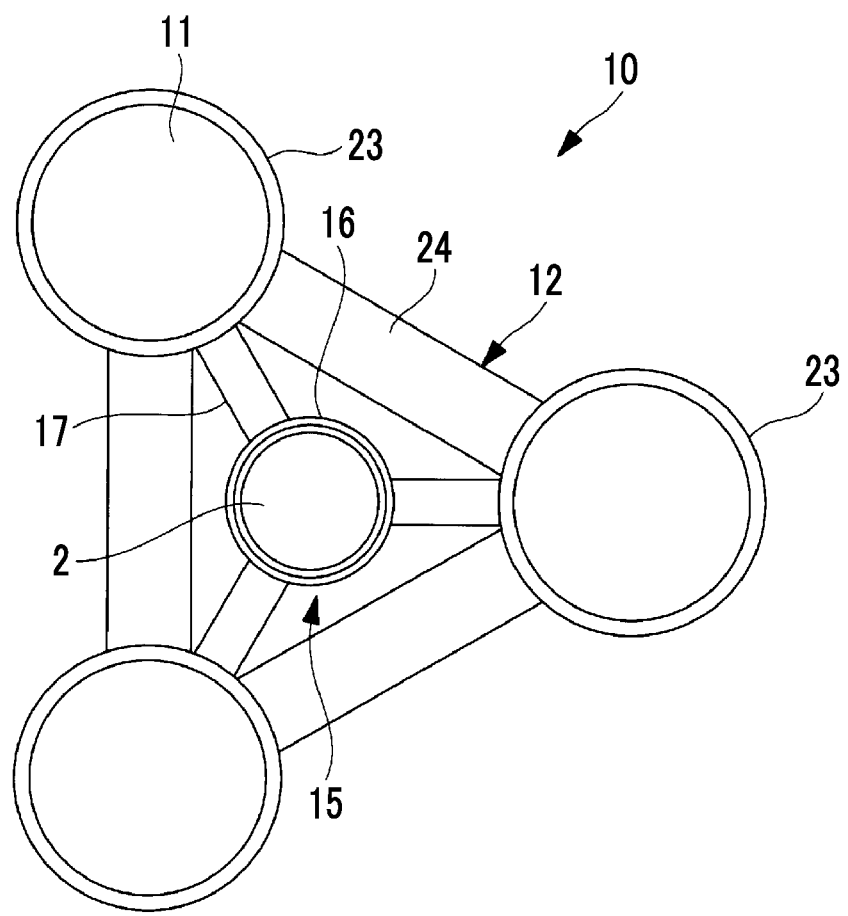
FIG. 4 is a plan view showing a first modification example of the support structure for a wind power generation device according to the embodiment of the present disclosure.
Figure 5:
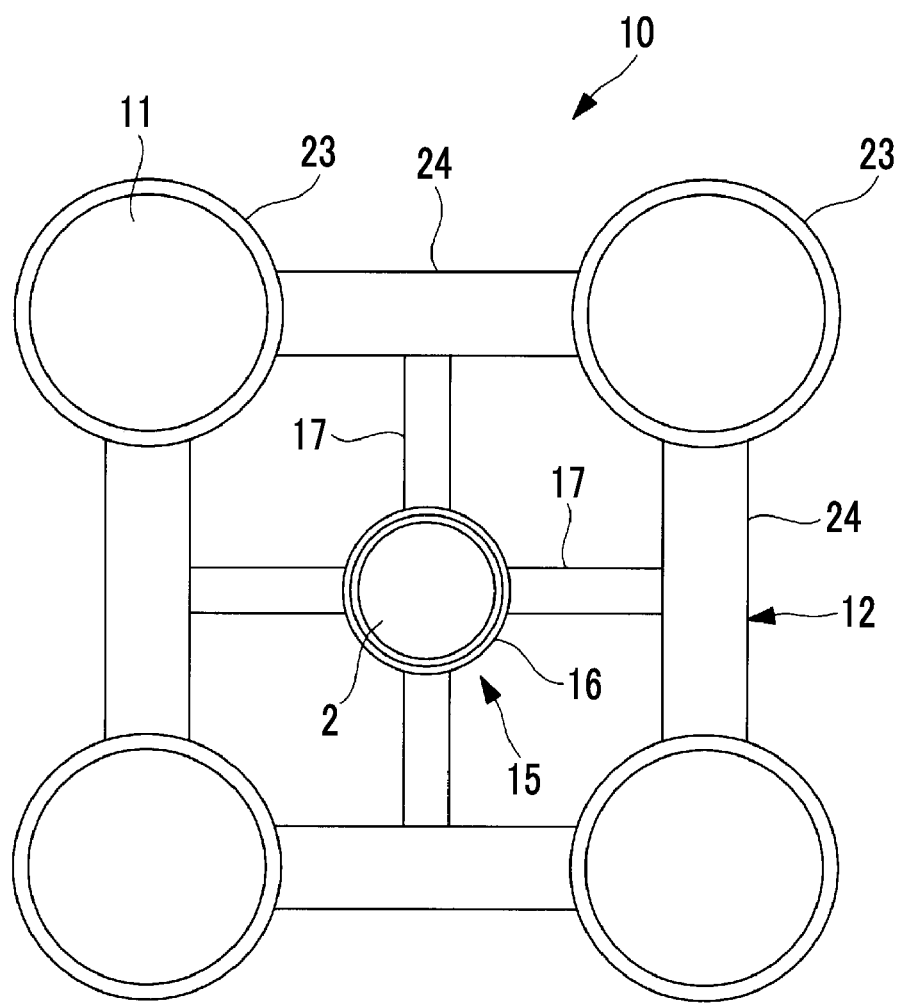
FIG. 5 is a plan view showing a second modification example of the support structure for a wind power generation device according to the embodiment of the present disclosure.
Figure 6:
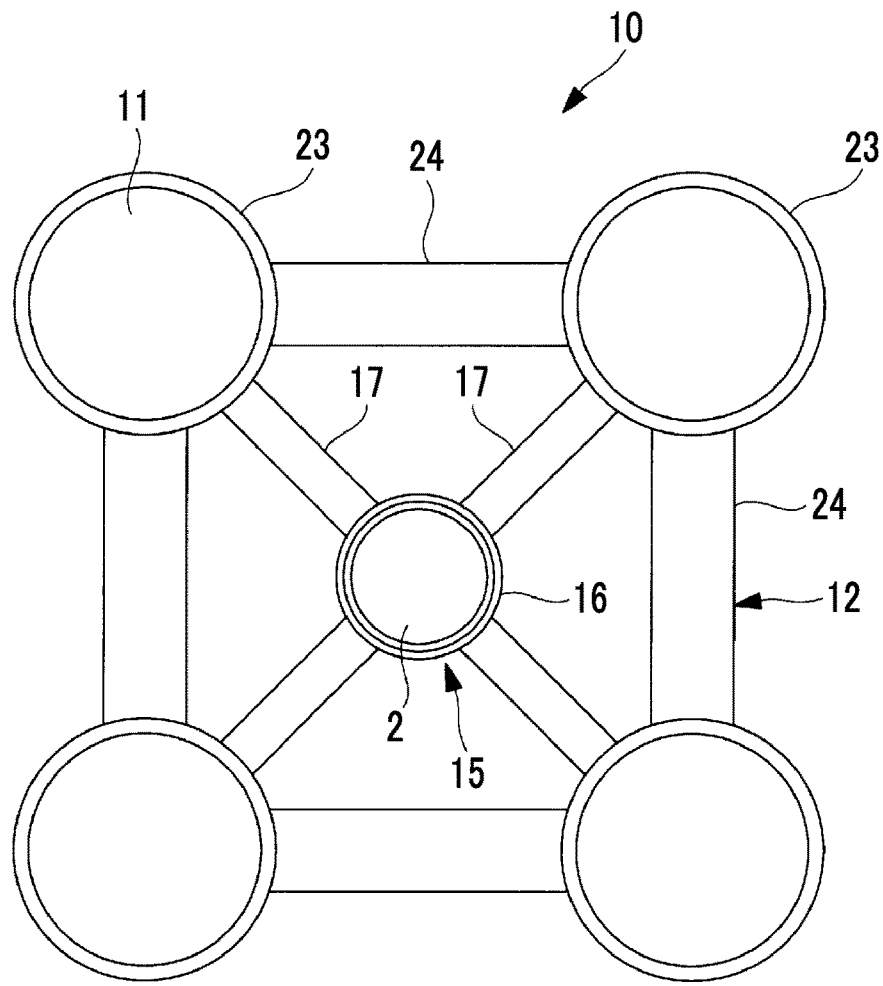
FIG. 6 is a plan view showing a third modification example of the support structure for a wind power generation device according to the embodiment of the present disclosure.

Each of the plurality of floats 11 has a configuration in which it is capable of floating on a water surface or in water, and the plurality of floats 11 are installed in a circumferential direction so as to surround the tower part 2 on the outside of the tower part in a radial direction. The float 11 may support the tower part 2 in a well-balanced manner, three floats 11 may be installed, or three or more floats 11 may be installed. FIGS. 3 and 4 show a case where three floats 11 are installed, and FIGS. 5 and 6 show a case where four floats 11 are installed.

The connecting member 12 includes, for example, a second annular member 23 in which a second opening portion 23A is formed, and a long member 24 installed on the outer peripheral surface of the second annular member 23. The second annular member 23 is installed on the float 11. One end of the long member 24 is connected to one float 11 among the plurality of floats 11, and the other end is connected to the other float 11 among the plurality of floats 11. The long member 24 mainly bears a force (bending, compression, tension, or the like) acting between the floats.

The support platform 13 is provided in a middle of the plurality of floats 11 and supports the foundation part 4 provided at the lower end of the tower part 2 of the wind power generation device 1. The support platform 13 supports the lower end of the tower part 2 on the lower side with respect to the lower end of the float 11. That is, the tower part 2 penetrates the support member 15, the lower portion of the tower part 2 extends to below the support member 15, and the position of the center of gravity of the tower part 2 is lowered to the lower side. In this way, stability against oscillation can be secured even if the height of the float 11 itself is lowered. Therefore, the time and cost required for manufacturing the float 11 can be reduced.

The wire member 14 is a linear member, one end of which is connected to the float 11 and the other end of which is connected to the support platform 13. The wire member 14 may be connected, on one end side thereof, to the connecting member 12, for example, the second annular member 23 or the long member 24 of the connecting member 12, instead of the float 11. The wire member 14 mainly bears a tensile force. As the wire member 14, a member having a stranded wire structure may be applied. In this way, damping is applied to the tower part 2 and the float due to the deformation caused by the expansion and contraction of the wire member 14. As a result, the effect of suppressing the oscillation that occurs in the tower part 2 and the float 11 is exhibited.

As shown in FIG. 2, for example, two wire members 14 are installed between the float 11 or the connecting member 12 and the support platform 13. The number of wire members 14 that are installed at each position is not limited to this example, and may be one wire member or three or more wire members. Further, for fail-safe, a spare wire member (not shown) may be additionally provided along the wire member 14.

Figure 8:
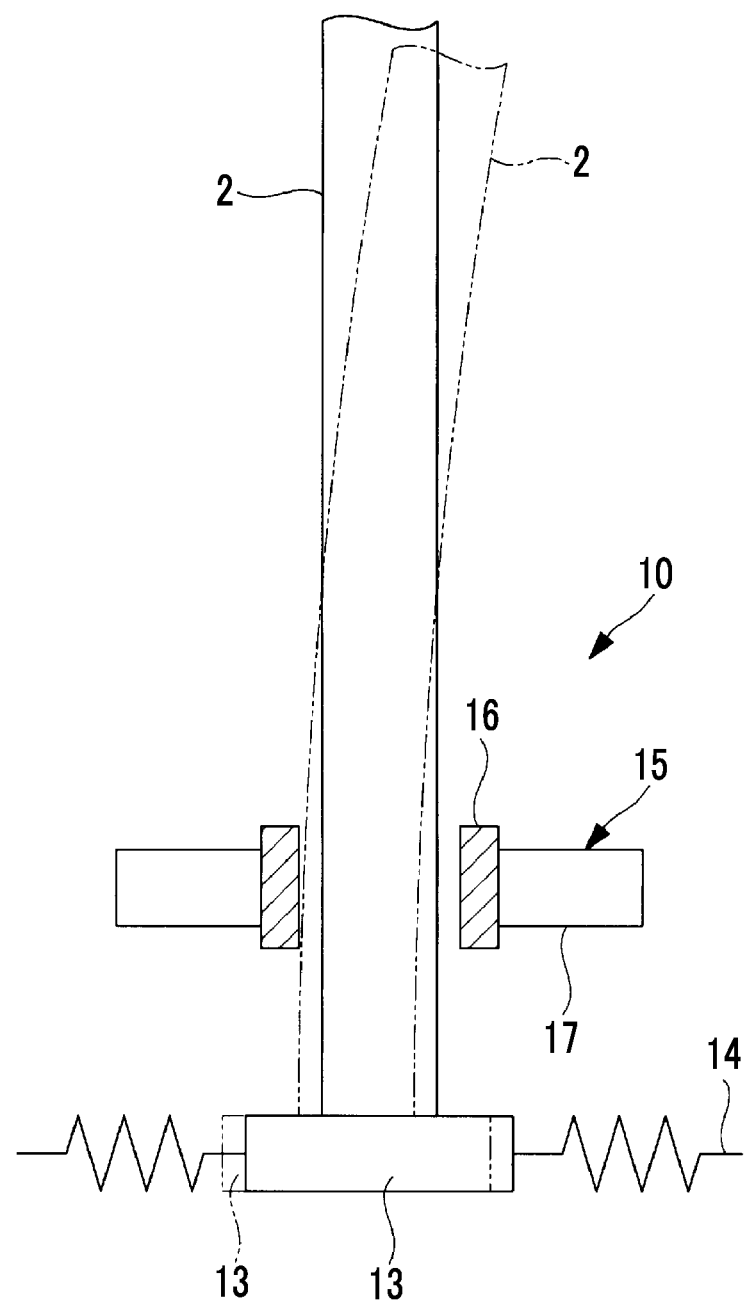
FIG. 8 is a schematic diagram showing the support structure according to the embodiment of the present disclosure.

As shown in FIGS. 3 to 6, one end of the support member 15 is provided at the second annular member 23 or the long member 24 of the connecting member 12, and as shown in FIG. 8, the support member 15 supports the tower part 2 supported on the support platform 13 from the side such that the tower part 2 is movable in the axial direction of the tower part 2.

Figure 7:
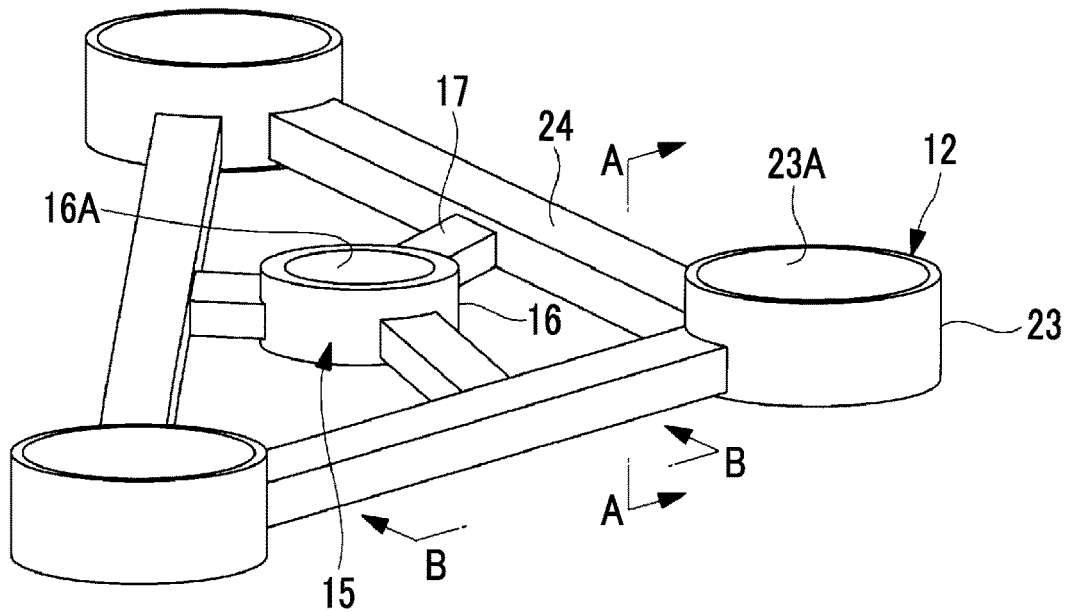
FIG. 7 is a perspective view showing a connecting member and a support member of the support structure according to the embodiment of the present disclosure.

As shown in FIG. 7, the support member 15 includes, for example, a first annular member 16 in which a first opening portion 16A is formed, and a long member 17 installed on the outer peripheral surface of the first annular member 16. The inner diameter of the first opening portion 16A is slightly larger than the outer diameter of the tower part 2. In the first annular member 16, the tower part 2 can be inserted into the first opening portion 16A, and the tower part 2 moves in the axial direction in the first opening portion 16A. As shown in FIG. 8, the tower part 2 is not joined to the support member 15 and penetrates the support member 15 with a gap. Since the tower part 2 is supported by the first annular member 16, collapse of the tower part 2 is prevented evenly over the entire circumferential direction.

In the long member 17 having one end connected to the first annular member 16 of the support member 15, as shown in FIGS. 3 and 5, the other end thereof may be connected to an intermediate portion of the connecting member 12, and as shown in FIGS. 4 and 6, the other end may be connected to an end portion of the connecting member 12, that is, the vicinity of the float 11. The support member 15 is not limited to the example described above, and may have another structure as long as it can satisfy the rigidity or strength requirement.

The float 11 and the connecting member 12 are connected to each other and rigidly joined together. Unlike a floating type support structure of the related art, the tower part 2 is not rigidly connected to the float 11. In the floating type support structure of the related art, the tower part and the float are rigidly connected to each other, so that the support structure becomes a cantilever type structure. Therefore, since a bending moment that occurs in the support structure becomes large, the strength required for the joint portion for joining the tower part and the float becomes large. In contrast, as shown in FIG. 8, in the present embodiment, the tower part 2 and the float 11 are not rigidly connected to each other, and the tower part 2 is installed to penetrate the first annular member 16 of the support member 15. Further, the tower part 2 is supported by the support member 15 from the side so as to be movable in the axial direction.

The vertical self-weight of the tower part 2 is transferred from the support platform 13 to the float 11 side through the wire member 14. Unlike a case where the float and the tower part are rigidly connected, the rigidly connected joint portion is not required, and the structure of the joint portion can be simplified. Therefore, the manufacturing process can also be simplified, and the time and cost required for manufacturing can be reduced.

Figure 9:
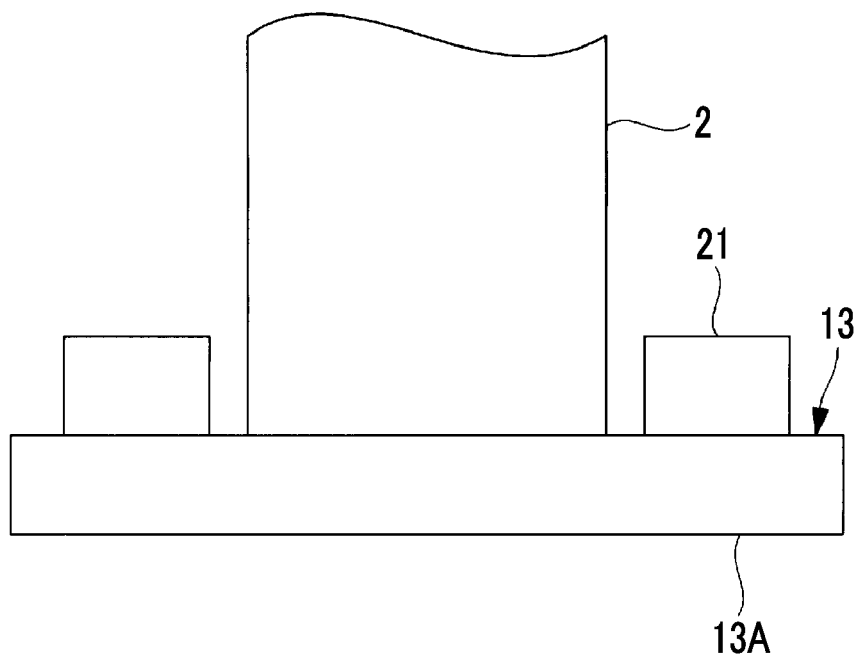
FIG. 9 is a vertical sectional view showing a first example of a support platform of the support structure according to the embodiment of the present disclosure.
Figure 10:
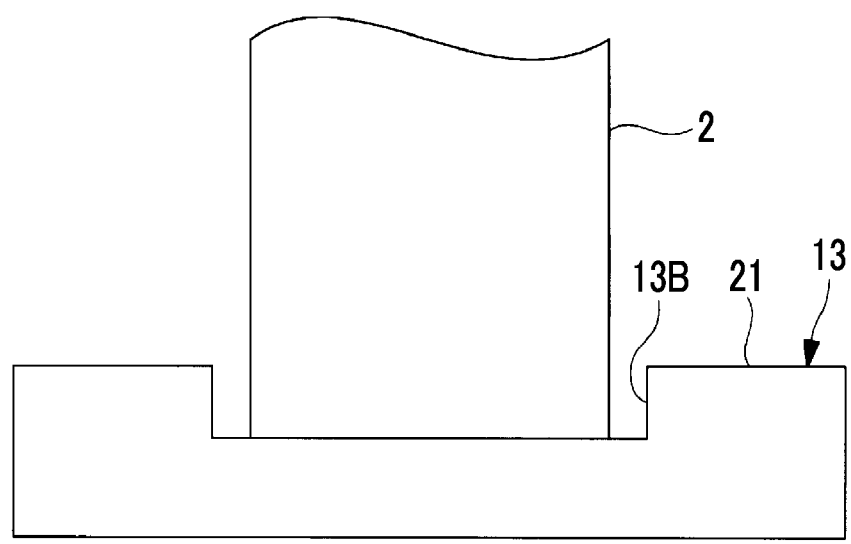
FIG. 10 is a vertical sectional view showing a second example of the support platform of the support structure according to the embodiment of the present disclosure.

Further, as shown in FIGS. 9 and 10, a configuration may be made such that the joint portion between the tower part 2 and the support platform 13 is not rigidly connected and the tower part 2 is movable in the horizontal direction on the support platform 13. Since the joint portion between the tower part 2 and the support platform 13 is not rigidly connected, the joint portion can be simplified and the time and cost required for manufacturing the joint portion can be reduced.

In this case, the support platform 13 may have a first protrusion portion 21 provided so as to surround the lower end of the tower part 2. The first protrusion portion 21 restrains the movement in the horizontal direction in a case where the tower part 2 moves in the horizontal direction, at the joint portion between the tower part 2 and the support platform 13. The first protrusion portion 21 may be provided so as to protrude upward with respect to a flat plate-shaped member 13A of the support platform 13, as shown in FIG. 9, or the first protrusion portion 21 surrounding the lower end of the tower part 2 may be provided by forming a recessed portion 13B in the support platform 13 itself, as shown in FIG. 10. The configuration of the first protrusion portion 21 is not limited to the example described above, as long as the movement in the horizontal direction of the tower part 2 can be restrained by the first protrusion portion 21.

A cushioning body (not shown) may be installed on the surface of the first protrusion portion 21, which faces the tower part 2. In this way, in a case where the tower part 2 moves in the horizontal direction, it is possible to prevent the tower part 2 from coming into direct impact contact with the support platform 13, and it is possible to reduce damage to the support platform 13. The cushioning body is, for example, a polymer-based material such as rubber, or a metal-based material having a honeycomb structure or the like.

Figure 11:
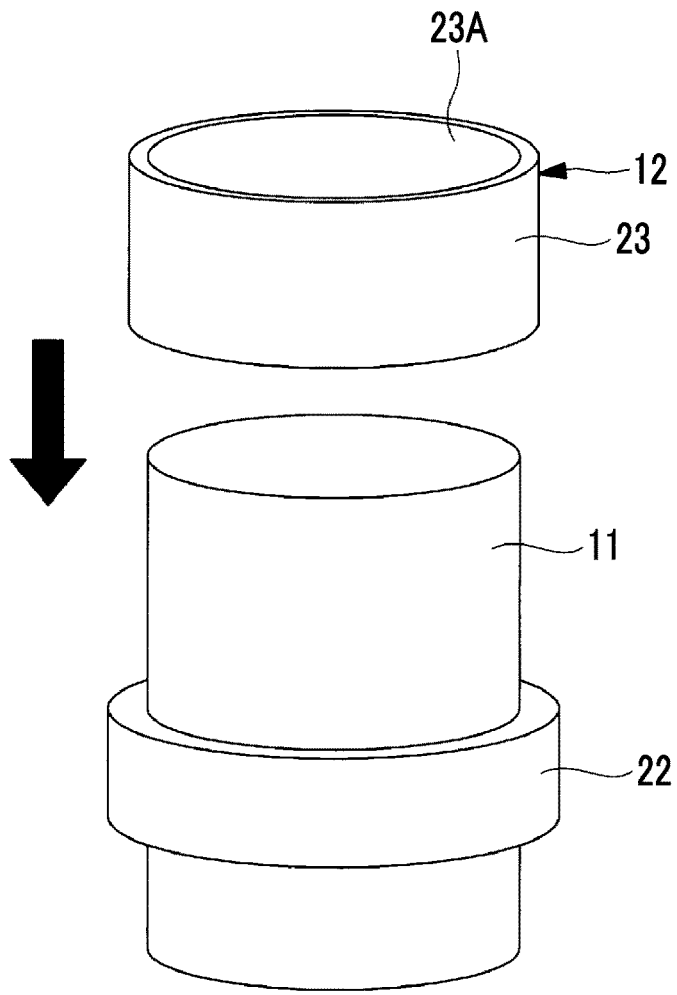
FIG. 11 is an exploded perspective view showing a float of the support structure according to the embodiment of the present disclosure.
Figure 12:
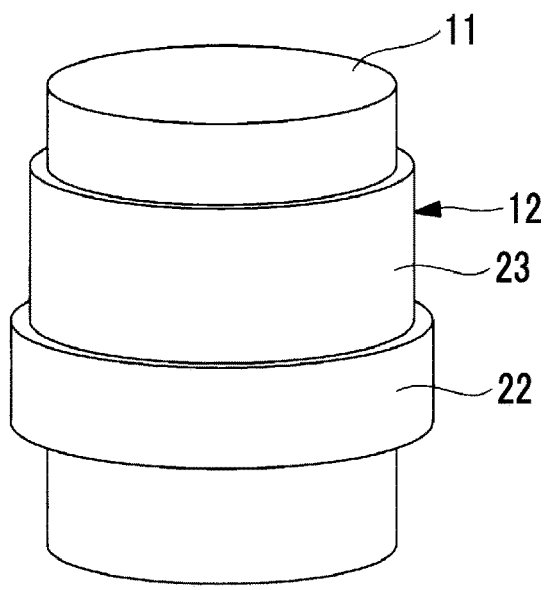
FIG. 12 is a perspective view showing the float of the support structure according to the embodiment of the present disclosure.

As shown in FIGS. 11 and 12, in the float 11 and the connecting member 12, a configuration may be made in which a second annular member 23 of the connecting member 12 is inserted from above the float 11 and supported in the vertical direction by a second protrusion portion 22 provided at the float 11. In this case, the float 11 is provided with the second protrusion portion 22 protruding in the radial direction on the outer peripheral surface of the float 11. Further, the connecting member 12 has the second annular member 23 in which the second opening portion 23A for inserting the float 11 is formed inside. The connecting member 12 is installed on the float 11 such that the lower end of the second annular member 23 comes into contact with the second protrusion portion 22. By installing the connecting member 12 on the float 11 such that the lower end of the second annular member 23 comes into contact with the second protrusion portion 22, the connecting member 12 and the float 11 are connected to each other.

The float 11 and the connecting member 12 are manufactured as separate bodies and assembled by a method in which the connecting member 12 is fitted to the float 11, and therefore, unlike the floating type support structure of the related art, on-site welding work or the like is not required. As a result, the time and cost required for manufacturing can be reduced.

The float 11 is made of a material such as concrete, steel, or FRP, and the material is not limited. Further, the material of the second protrusion portion 22 that is formed on the float 11 is also not limited, and may be made of a material different from the material of the main body of the float 11. The second protrusion portion 22 may be provided such that the upper end thereof is located at a position equal to or lower than ½ of the height of the float 11. In this way, the position where the lower end of the connecting member 12 comes into contact with the upper end of the second protrusion portion 22 is located at a position equal to or lower than ½ of the height of the float 11, so that structural stability is easily obtained.

The float 11 has a hollow structure. In this case, a bottom plate of the float 11 has a structure integral with a side wall. A ballast for adjusting a draft height is accommodated in the float 11. Therefore, an upper lid of the float 11 has a structure separate from the side wall. The material of the upper lid is also not limited, and the upper lid is made of a material such as concrete, steel, or FRP.

Figure 13:
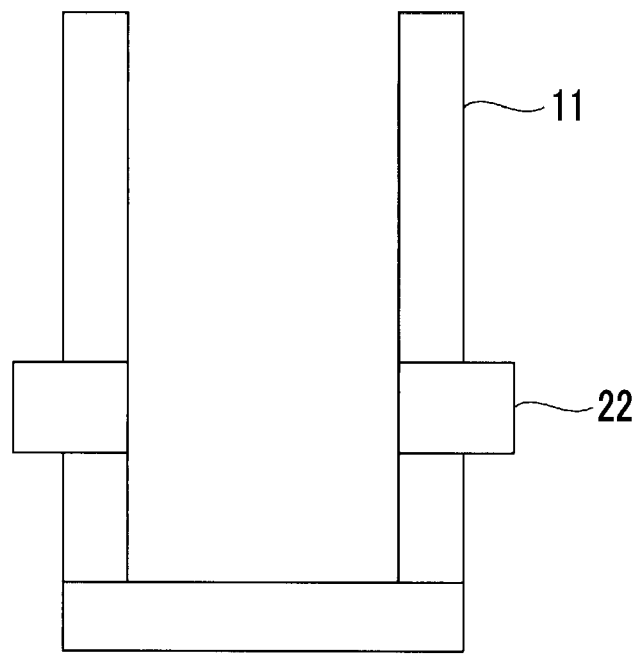
FIG. 13 is a vertical sectional view showing a first example of the float of the support structure according to the embodiment of the present disclosure.
Figure 14:
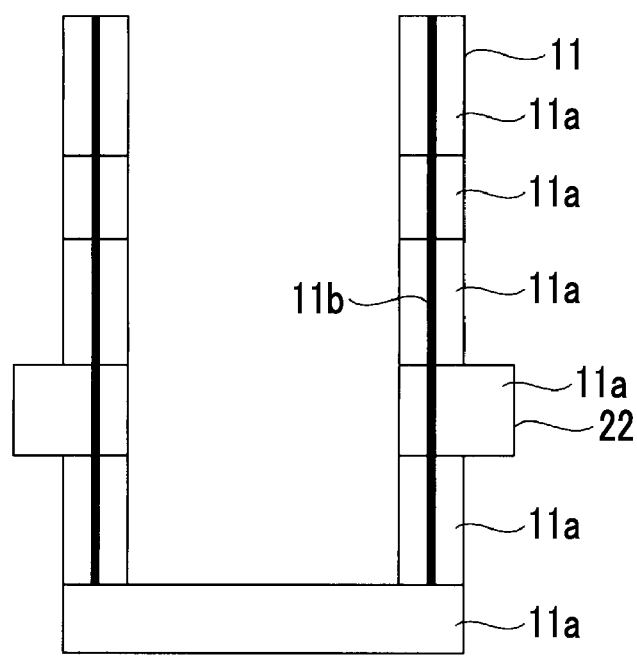
FIG. 14 is a vertical sectional view showing a second example of the float of the support structure according to the embodiment of the present disclosure.

In a case where the float 11 is made of concrete, corrosion resistance is improved as compared with the float 11 made of steel, and maintenance becomes easy. Further, in a case where the float 11 is made of concrete, since the weight can be reduced and mass production using a formwork can be performed, the cost can be reduced. As shown in FIG. 13, the float 11 having a concrete structure may be a reinforced concrete (RC) structure that is cast on site, or a pretension type having a pre-stressed concrete structure. Further, as shown in FIG. 14, the float 11 having a concrete structure may be a combination of a plurality of divided members 11a, or a post-tension type of a precast concrete structure in which a tensile force is applied to a steel material 11b. Further, high-strength concrete mixed with steel fibers may be used.

Figure 15:
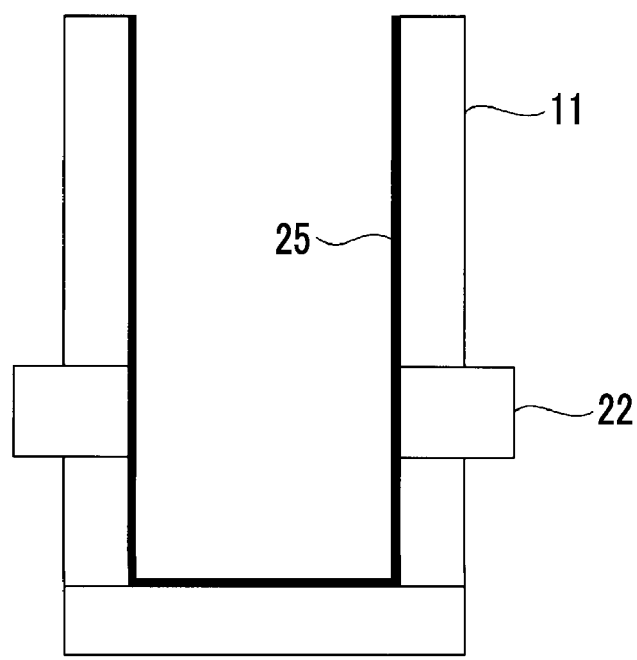
FIG. 15 is a vertical sectional view showing a third example of the float of the support structure according to the embodiment of the present disclosure.

In a case where the float 11 is made of concrete, as shown in FIG. 15, it is desirable to install a thin steel sheet 25 on the inner wall of the hollow portion. In this way, the water-tightness of the float 11 can be secured. The thin steel sheet 25 does not need to be a strength member.

As shown in FIG. 7, the connecting member 12 and the support member 15 are integrated. Further, the second annular member 23 and the long member 24 are integrated in the connecting member 12, and the first annular member 16 and the long member 17 are integrated in the support member 15. In the manufacturing process, in a case where all the members are joined and integrated on land, the number of on-site (offshore) assembly processes can be reduced, and thus the time and cost required for manufacturing can be reduced.

Figure 16:
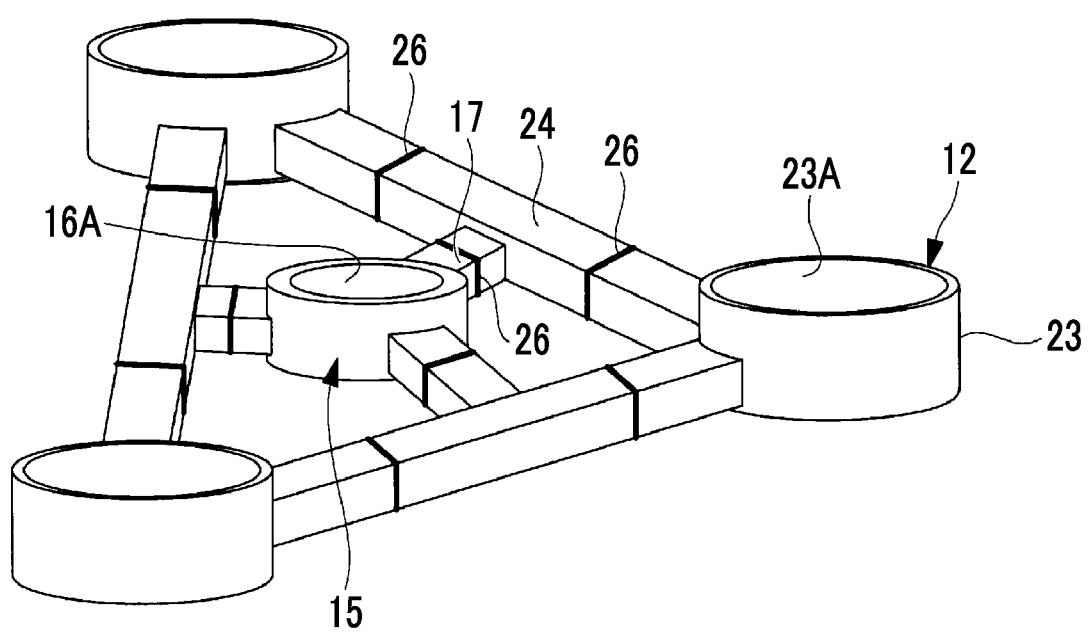
FIG. 16 is a perspective view showing a modification example of the connecting member and the support member of the support structure according to the embodiment of the present disclosure.

As shown in FIG. 16, the connecting member 12 and the support member 15 may be joined and integrated at a plurality of dividing lines 26. In this manner, even in a case where the connecting member 12 and the support member are not integrated, if a certain range can be integrally manufactured and the number of on-site joining locations can be reduced as much as possible, the time and cost required for manufacturing can be reduced. In a case where joining of each member is performed, the joining method is not limited to welding, bolt joining, or the like. In the case of welding, it is possible to suppress water infiltration to the inside of the member.

Figure 17A:
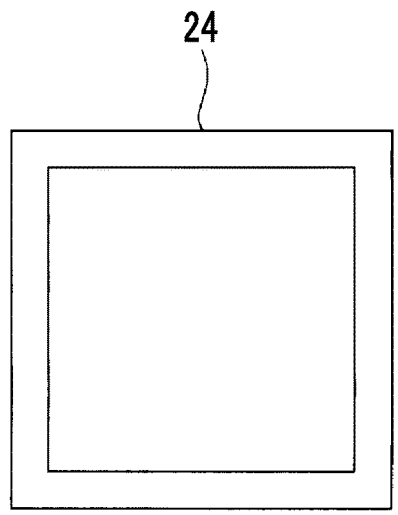
FIGS. 17A to 17C are cross-sectional views showing the connecting member of the support structure according to the embodiment of the present disclosure, and sectional views as viewed from the direction of an arrow A of FIG. 7.
Figure 17B:
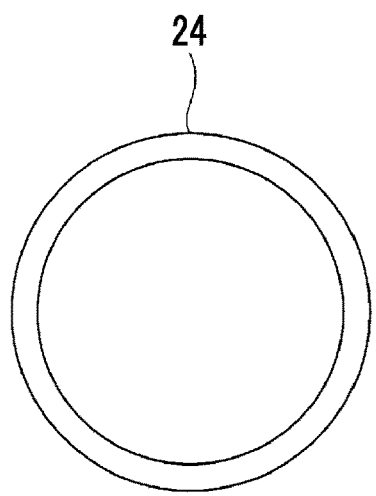
Figure 17C:
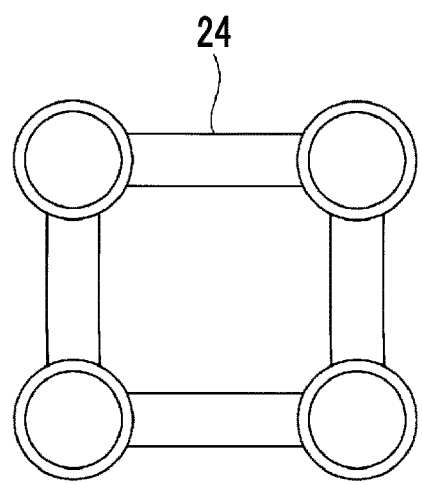

As shown in FIGS. 17A to 17C, the long member 24 of the connecting member 12 has a shaped steel (refer to FIGS. 17A and 17B and FIG. 18A), a truss structure (refer to FIG. 18B), or a rigid frame structure (refer to FIGS. 17C and 18C). In the case of the shaped steel, the cross-sectional shape may be a square shape (refer to FIG. 17A) or a round shape (refer to FIG. 17B). Any structure may be adopted for the long member 24 as long as a predetermined strength or rigidity can be secured.

Figure 19:
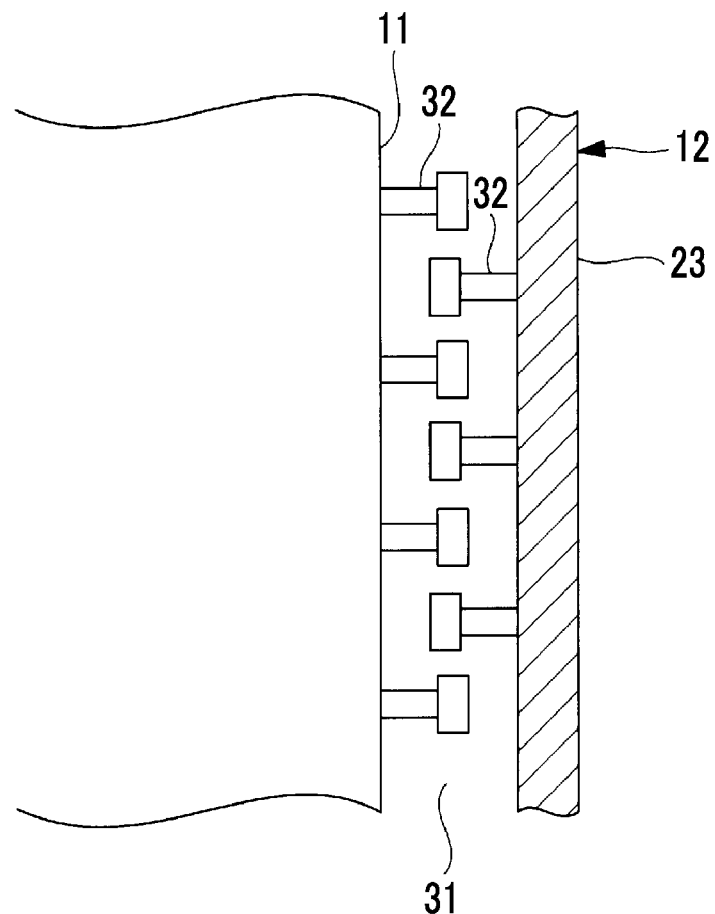
FIG. 19 is an enlarged vertical sectional view showing a first example of a connecting portion between the float and the connecting member of the support structure according to an embodiment of the present disclosure.

FIG. 19 shows a first example of a connecting portion between the float 11 and the connecting member 12 of the support structure 10 according to the present embodiment.

As shown in FIG. 19, the float 11 and the connecting member 12 are fixed to each other by, for example, a filling material 31 filled between the float 11 and the second annular member 23 of the connecting member 12. The filling material is, for example, grout, mortar or an adhesive. In this case, the filling material is filled after the connecting member 12 is fitted and installed to the float 11.

In the above structure, as shown in FIG. 19, it is desirable that a shear load transfer member 32 is installed on the outer peripheral surface side of the float 11 and/or the inner peripheral surface side of the second annular member 23 of the connecting member 12. The shear load transfer member 32 is a stud bolt, a rib, a surface processed into a projection shape, or the like. By installing the shear load transfer member 32, it is possible to improve the shear strength, the tensile strength, or the joint strength that is generated between the float 11 and the connecting member 12, as compared with a case where only the filling material 31 is filled.

Figure 20:
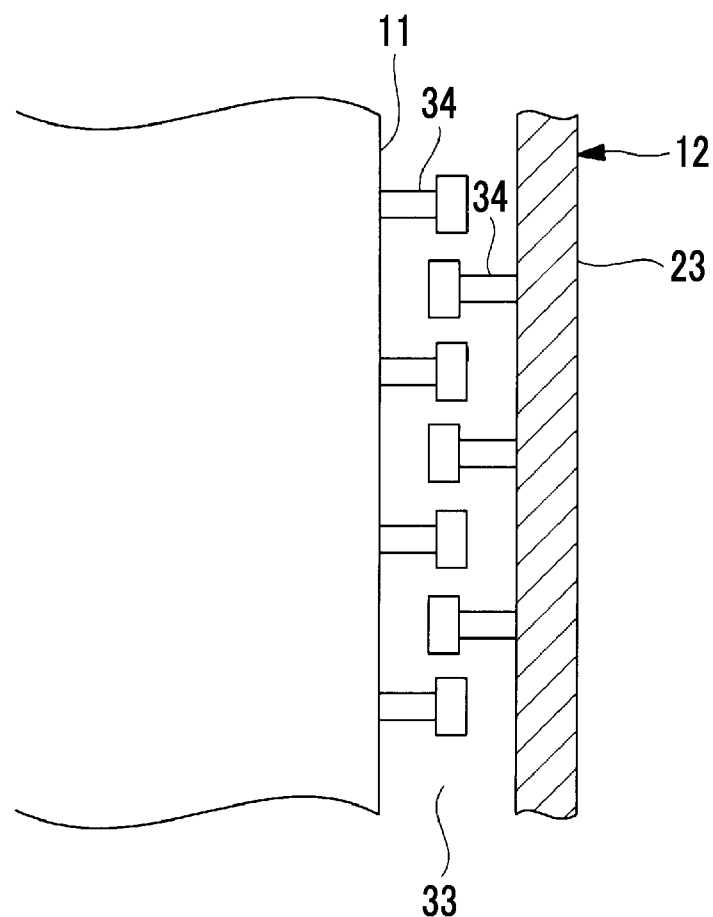
FIG. 20 is an enlarged vertical sectional view showing a second example of the connecting portion between the float and the connecting member of the support structure according to an embodiment of the present disclosure.
Figure 21:
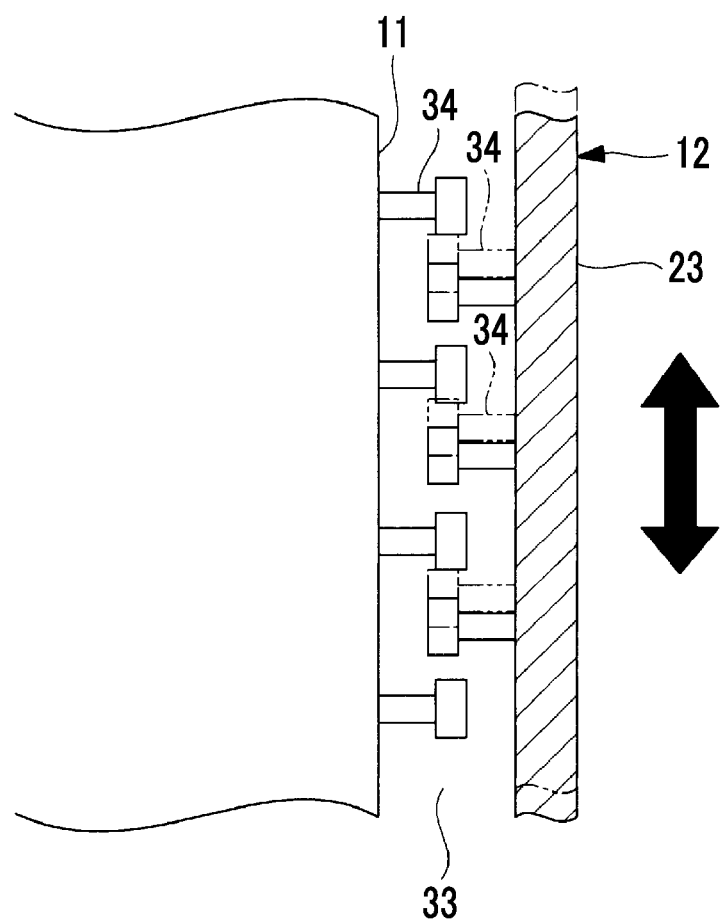
FIG. 21 is an enlarged vertical sectional view showing the second example of the connecting portion between the float and the connecting member of the support structure according to an embodiment of the present disclosure.

Further, FIGS. 20 and 21 show a second example of the connecting portion between the float 11 and the connecting member 12 of the support structure 10 according to the present embodiment. As shown in FIGS. 20 and 21, a rigid body in viscous fluid 33 may be filled between the float 11 and the connecting member 12. The relative displacement that occurs between the float 11 and the connecting member 12 is attenuated by the rigid body in viscous fluid 33. Projection portions 34 are installed on the outer peripheral surface side of the float 11 and the inner peripheral surface side of the second annular member 23 of the connecting member 12. The projection portion 34 is a stud bolt, a rib, a surface processed into a projection shape, or the like. The rigid body in viscous fluid 33 is, for example, a silicon-based material. In this way, when the wind power generation device 1 oscillates, relative displacement occurs between the float 11 and the connecting member 12. Since viscous resistance damping is applied to the float 11 and the connecting member 12 due to the relative displacement that occurs between the rigid body in viscous fluid 33 and the projection portion 34, the effect of suppressing the oscillation that occurs in the float 11 and the connecting member 12 is exhibited.

Further, in the support member 15 and the tower part 2, the relative displacement that occurs between the support member 15 and the tower part 2 may be attenuated by a rigid body in viscous fluid (not shown) that is filled between the support member 15 and the tower part 2. In this case, projection portions are installed on the outer peripheral surface side of the tower part 2 and the inner peripheral surface side of the first annular member of the support member 15, and when the wind power generation device 1 oscillates, viscous resistance damping is applied to the support member 15 and the tower part 2 due to the relative displacement that occurs between the rigid body in viscous fluid and the projection portion. As a result, the effect of suppressing the oscillation that occurs in the support member 15 and the tower part 2 is exhibited.

A method for manufacturing the wind power generation device 1 according to the present embodiment will be described.

Figure 22B:
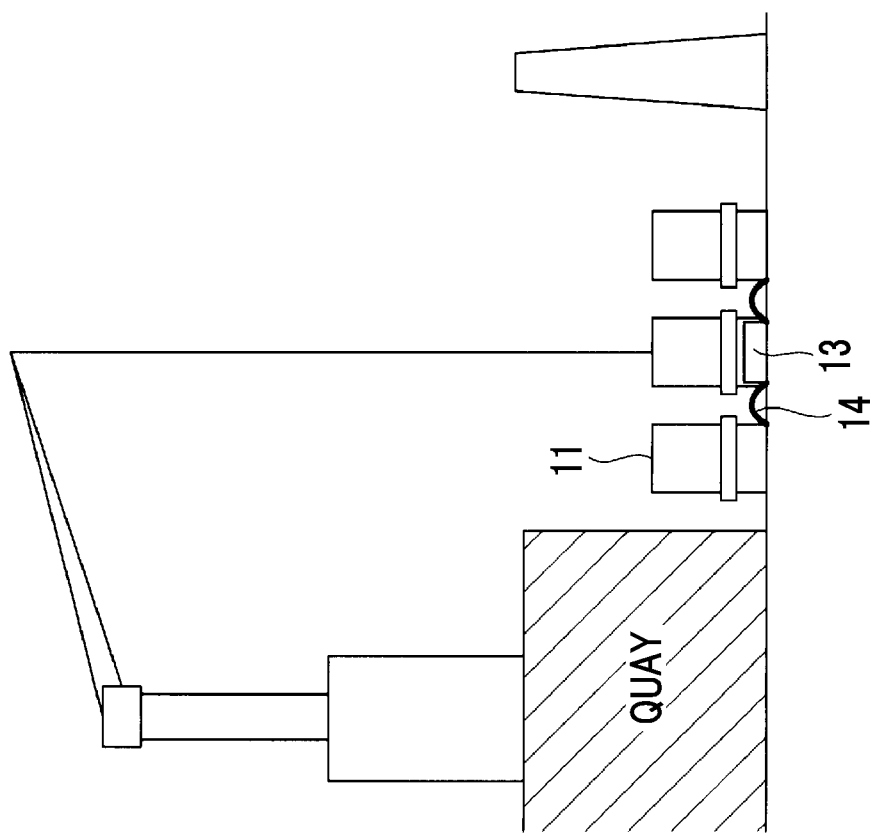
FIGS. 22A and 22B are explanatory diagrams showing a method for manufacturing the support structure for a wind power generation device according to the embodiment of the present disclosure.
Figure 22A:
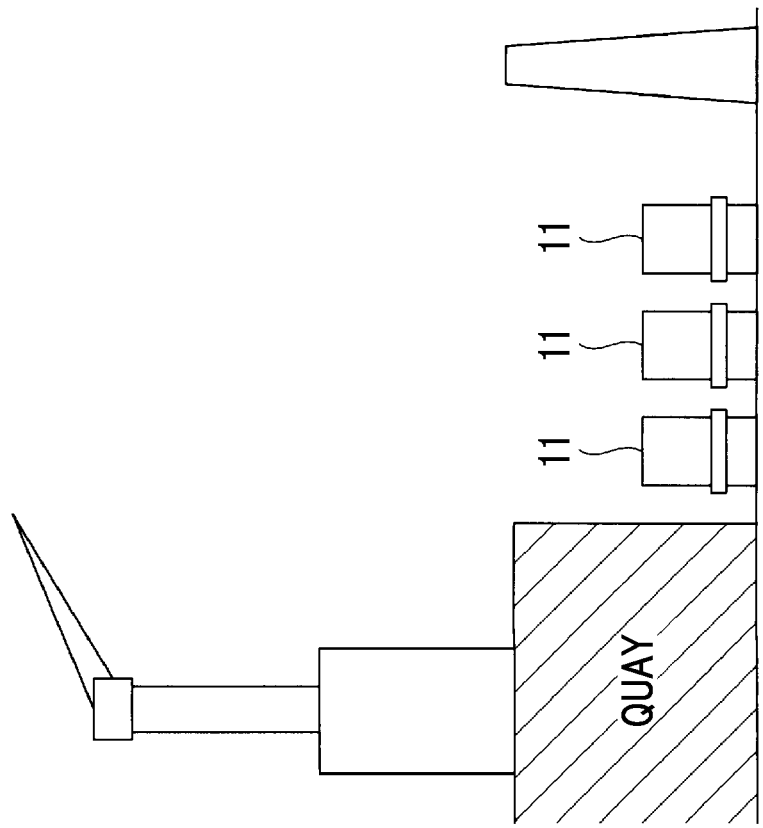
Figure 26:
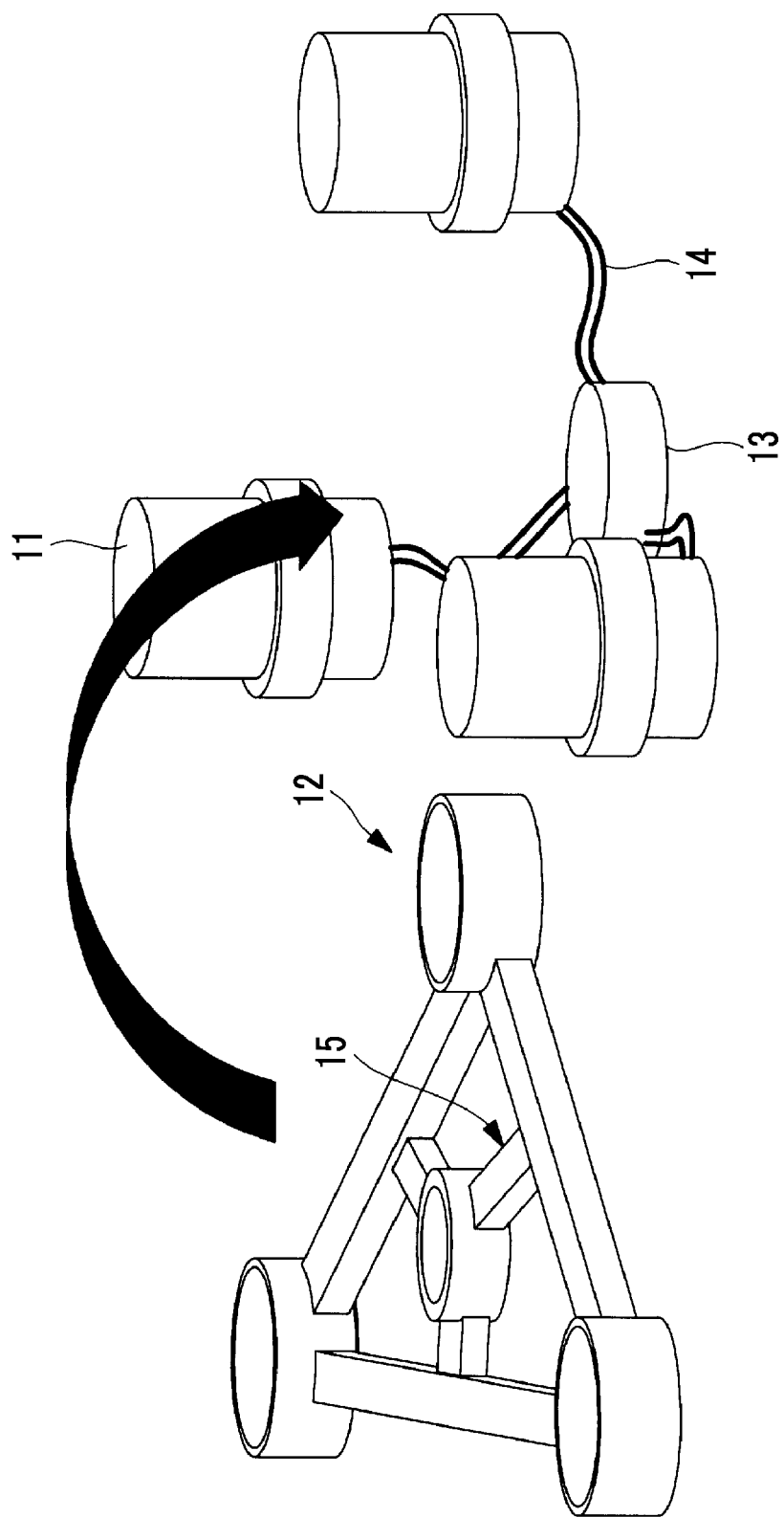
FIG. 26 is a perspective view showing the method for manufacturing the support structure for a wind power generation device according to the embodiment of the present disclosure.

First, as shown in FIG. 22A, the float 11 is individually manufactured, and a plurality of manufactured floats 11 are installed on a dry dock. Then, as shown in FIGS. 22B and 26, the support platform 13 is installed at a predetermined position such as a position between the floats 11. Further, the wire member 14 that couples the support platform 13 and the float 11 is installed.

Figure 23C:
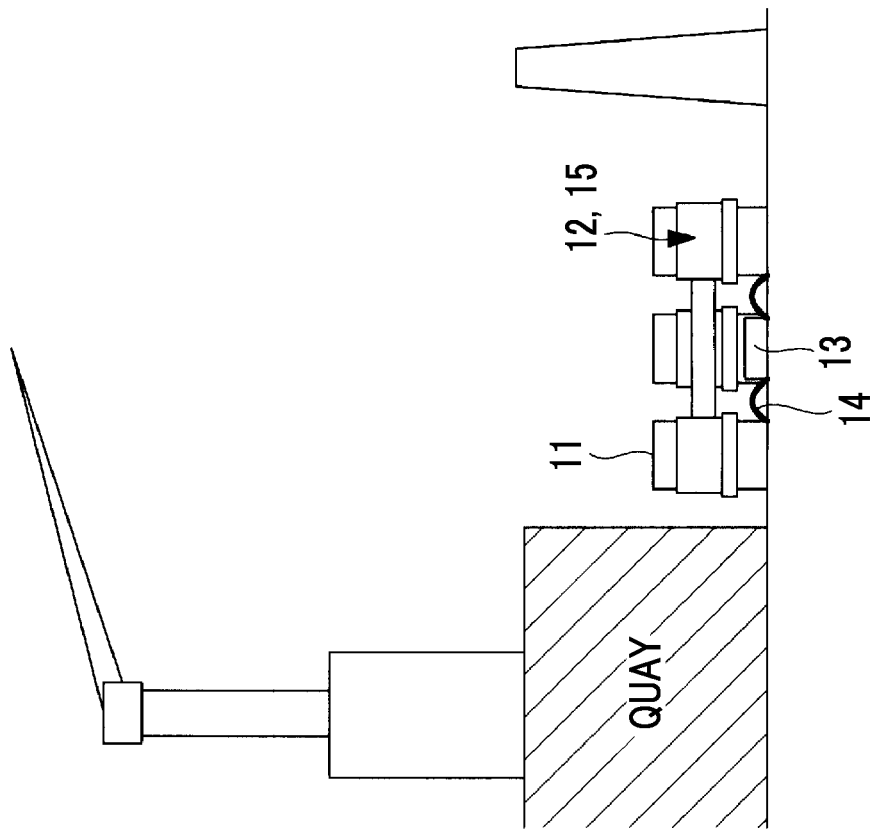
FIGS. 23C and 23D are explanatory diagrams showing the method for manufacturing the support structure for a wind power generation device according to the embodiment of the present disclosure.
Figure 23D:
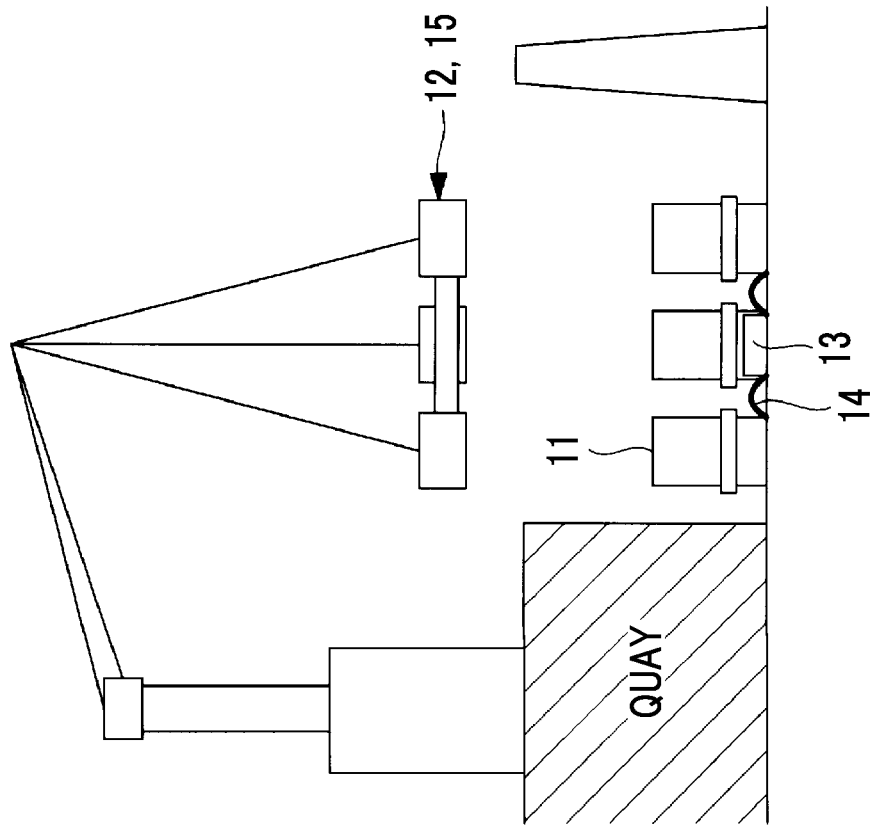
Figure 27:
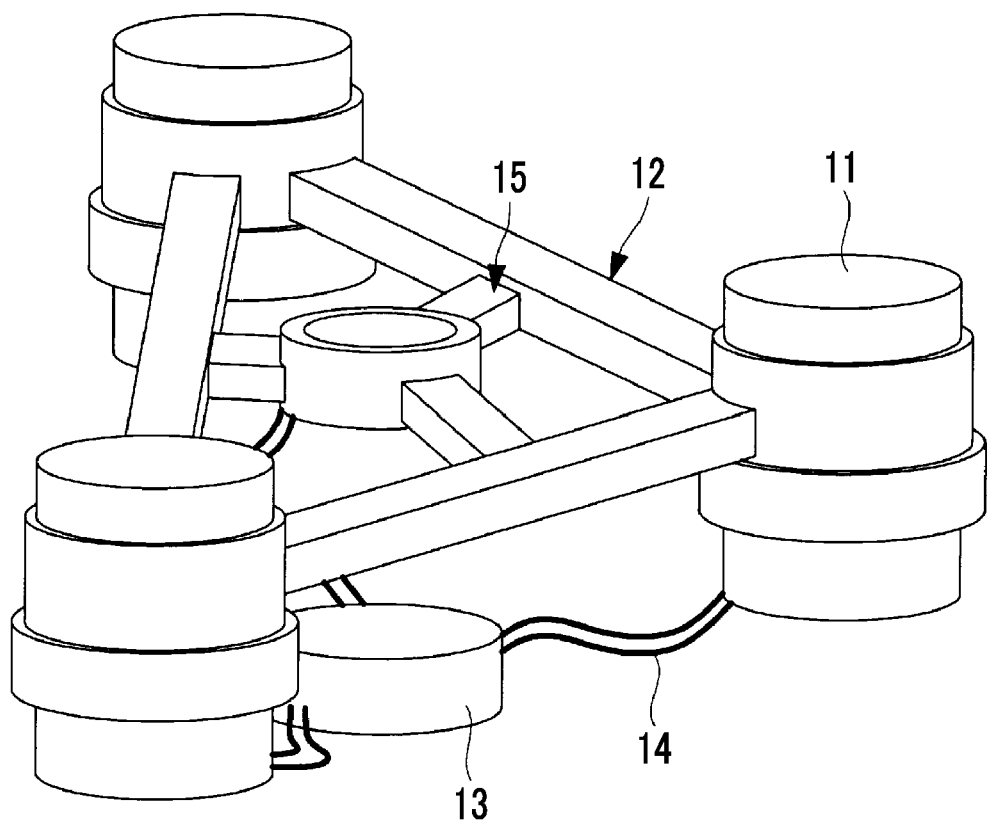
FIG. 27 is a perspective view showing the method for manufacturing the support structure for a wind power generation device according to the embodiment of the present disclosure.

On the other hand, as shown in FIG. 26, the connecting member 12 and the support member 15 are integrated or are separately manufactured as a plurality of divided members in a number smaller than the number of components. Then, as shown in FIGS. 23C and 26, the connecting member 12, the support member 15, and the float are assembled in a form of dropping from above the float 11 installed on the dry dock. In this way, as shown in FIGS. 23D and 27, the float 11 and the connecting member 12 are coupled together.

There is no limitation to the order described above, and for example, after the support platform 13 is installed at a predetermined position such as a position between the floats 11, unlike the example shown in FIG. 22B, before connecting the wire member 14, the integrated connecting member 12 and the support member 15 may be dropped from above the float 11 to assemble the connecting member 12 and the support member 15, and the float 11. Thereafter, the wire member 14 is installed between the connecting member 12 and the support platform 13.

Figure 24F:
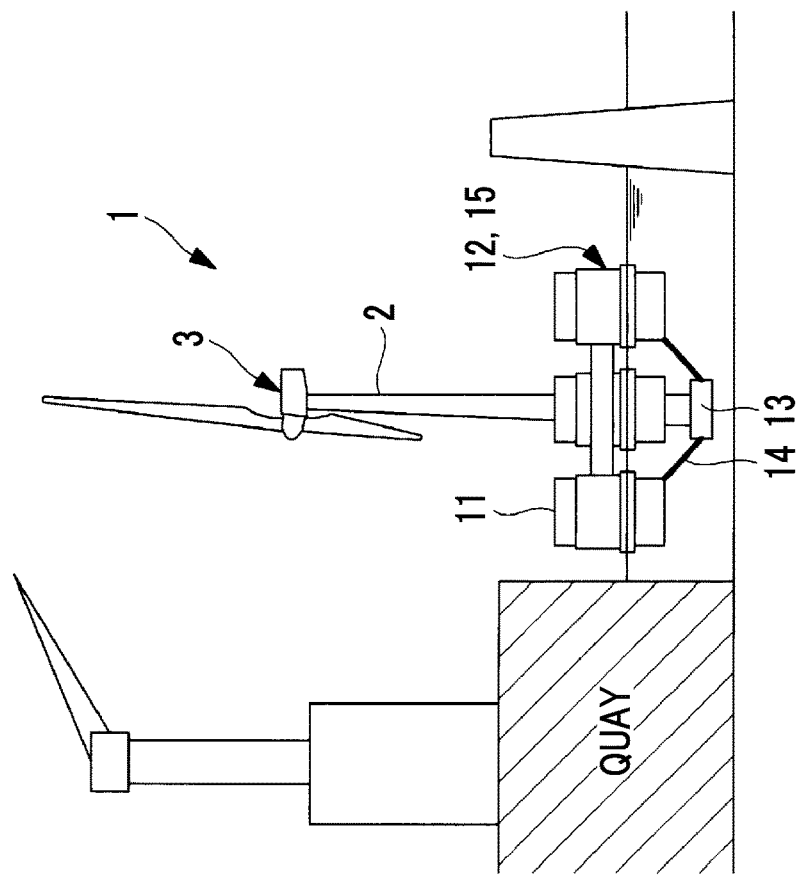
FIGS. 24E and 24F are explanatory diagrams showing the method for manufacturing the support structure for a wind power generation device according to the embodiment of the present disclosure.
Figure 24E:
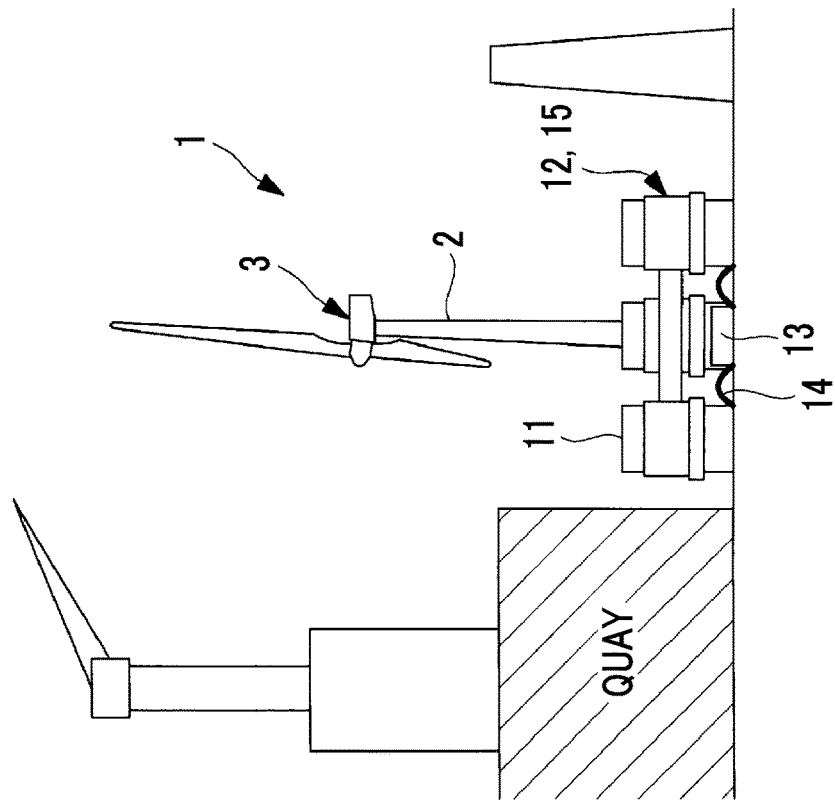
Figure 25G:
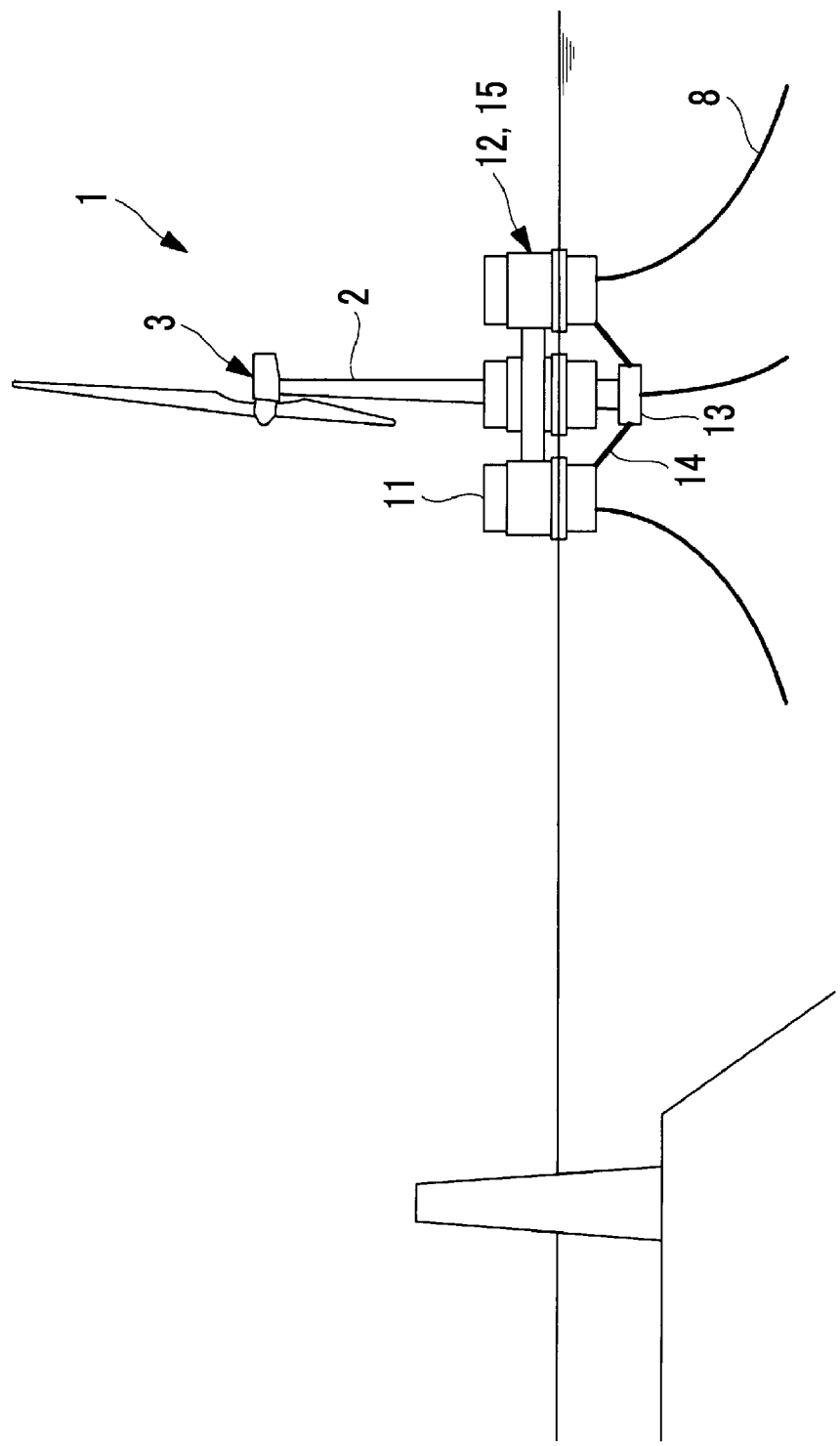
FIG. 25G is an explanatory diagram showing the method for manufacturing the support structure for a wind power generation device according to the embodiment of the present disclosure.
Figure 28:
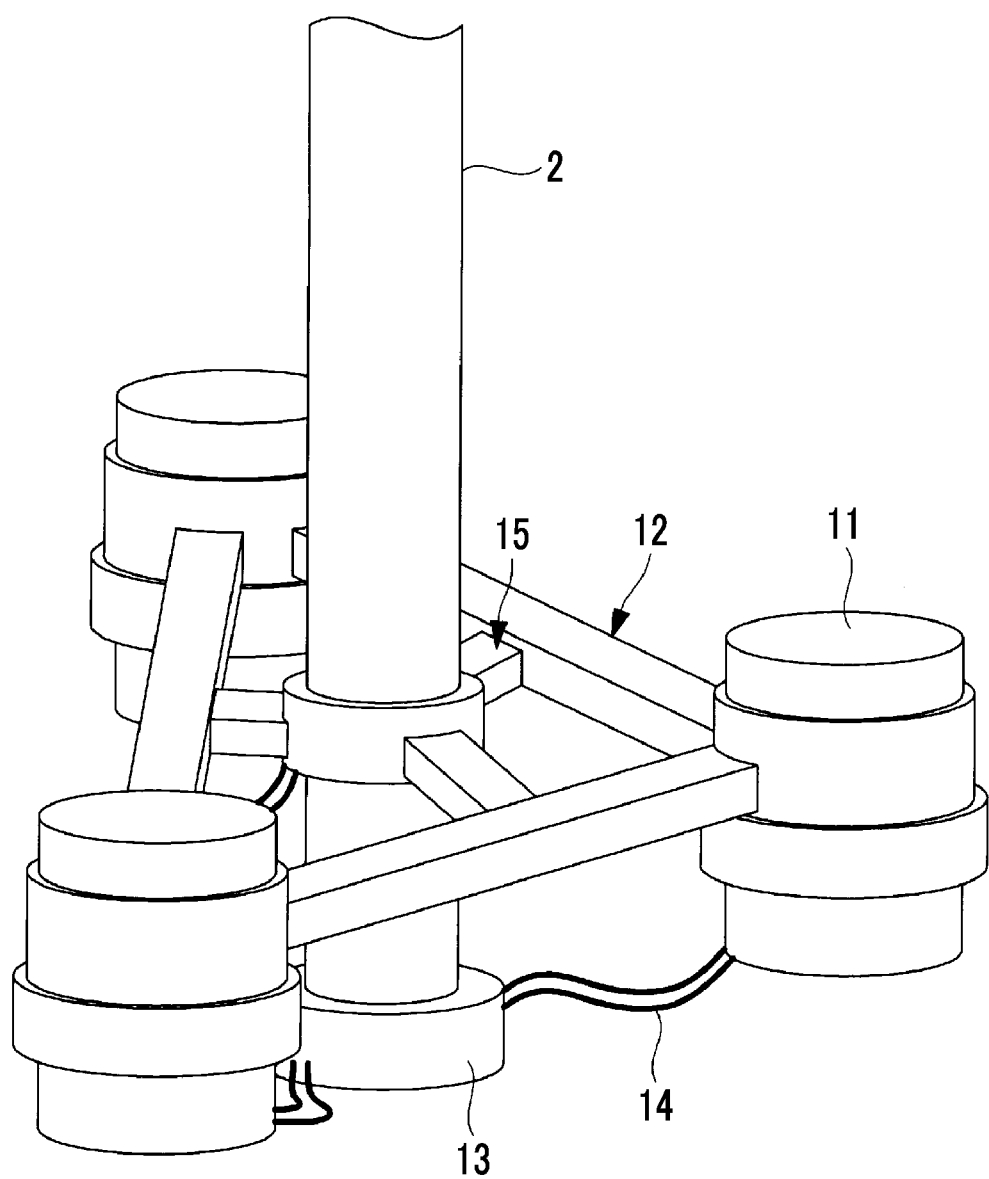
FIG. 28 is a perspective view showing the method for manufacturing the support structure for a wind power generation device according to the embodiment of the present disclosure.
Figure 29:
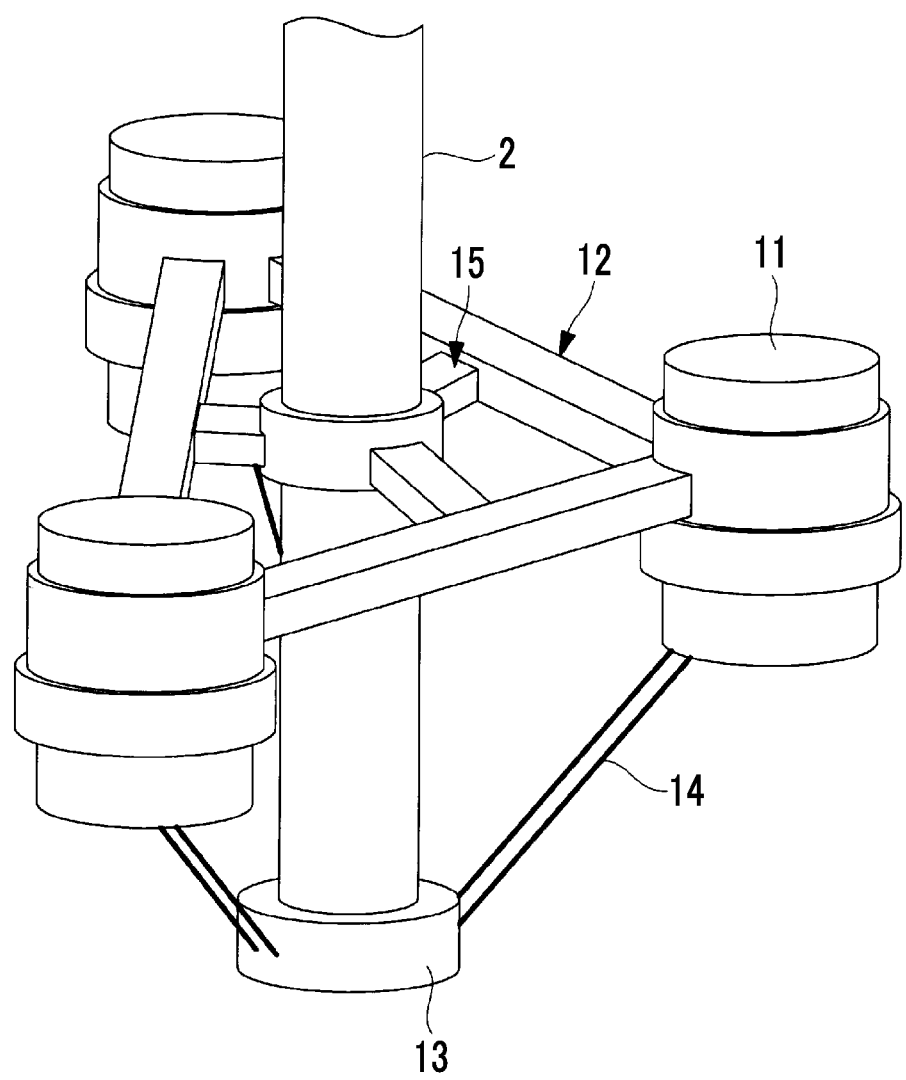
FIG. 29 is a perspective view showing the method for manufacturing the support structure for a wind power generation device according to the embodiment of the present disclosure.

Next, as shown in FIGS. 24E and 28, by installing the lower portion of the tower part 2 on the support platform 13, the wind power generation device 1 is completed. At this time, the wind turbine part 3 is installed at the upper portion of the tower part 2. Thereafter, as shown in FIGS. 24F and 29, water is injected into the dry dock, so that the wind power generation device 1 enters a state of floating on a water surface or in water in a state of being supported by the support structure 10. Then, the wind power generation device 1 is transported to a predetermined installation location on the ocean, and is moored to the seabed by the anchor cable 8, as shown in FIG. 25G.

According to the manufacturing method described above, unlike the construction method disclosed in PTL 1 or the like, in which a plurality of components are individually manufactured and then the components are assembled, the construction man-hour can be reduced and the time and cost relating to the construction can be reduced. Further, since the assembly work is performed on land, a barge for the work at sea is not required, and the work efficiency is improved because there is no influence of disturbances such as ocean waves.

The support structure for a wind power generation device and the wind power generation device according to the embodiment described above are grasped as follows, for example.

The support structure (10) for a wind power generation device (1) according to the present disclosure includes: a plurality of floats (11) capable of floating on a water surface or in water; a connecting member (12) having one end connected to one float among the plurality of floats and the other end connected to the other float among the plurality of floats; a support platform (13) that is provided in a middle of the plurality of floats and supports a lower end of a tower part of the wind power generation device; a linear wire member (14) having one end connected to the float or the connecting member and the other end connected to the support platform; and a support member (15) that is provided at the float or the connecting member and supports the tower part supported on the support platform from the side such that the tower part is movable in an axial direction of the tower part.

According to this configuration, a plurality of floats can float on a water surface or in water, and the floats are connected to each other through the connecting member. The support platform provided in a middle of the plurality of floats is connected to the float or the connecting member through the wire member, and supports the lower end of the tower part of the wind power generation device. The support member provided at the float or the connecting member supports the tower part supported on the support platform from the side such that the tower part is movable in the axial direction of the tower part. The tower part is not rigidly connected to the float but is supported by the support member from the side so as to be movable in the axial direction. The vertical self-weight of the tower part is transferred from the support platform to the float side through the wire member. Unlike a case where the float and the tower part are rigidly connected, the rigidly connected joint portion is not required, and the structure of the joint portion can be simplified.

In the support structure for a wind power generation device according to the present disclosure, the support platform may support the lower end of the tower part on a lower side with respect to a lower end of the float.

According to this configuration, since the lower end of the tower part is supported on the lower side with respect to the lower end of the float by the support platform and the position of the center of gravity is lowered to the lower side, stability against oscillation can be secured even if the height of the float itself is lowered.

In the support structure for a wind power generation device according to the present disclosure, the support member may include a first annular member (16) in which a first opening portion (16A) for inserting the tower part is formed inside, and the tower part may be movable in the axial direction in the first opening portion.

According to this configuration, the support member has the first annular member in which the first opening portion is formed, and the tower part can be inserted into the first annular member, and the tower part moves in the axial direction in the first opening portion. Since the tower part is supported by the first annular member, collapse of the tower part is prevented evenly over the entire circumferential direction.

In the support structure for a wind power generation device according to the present disclosure, the support platform may include a first protrusion portion (21) provided to surround the lower end of the tower part.

According to this configuration, the first protrusion portion is provided to surround the lower end of the tower part in the support platform, and the movement in the horizontal direction of the tower part can be restrained by the first protrusion portion.

In the support structure for a wind power generation device according to the present disclosure, a second protrusion portion (22) that protrudes in a radial direction is provided on the outer peripheral surface of the float, the connecting member may include a second annular member (22) in which a second opening portion (23A) for inserting the float is formed inside, and the connecting member is installed on the float such that a lower end of the second annular member comes into contact with the second protrusion portion.

According to this configuration, the second protrusion portion that protrudes in the radial direction is provided on the outer peripheral surface of the float, the connecting member has the second annular member having the second opening portion formed therein, and the float can be inserted into the second annular member. The connecting member and the float are connected by installing the connecting member on the float such that the lower end of the second annular member comes into contact with the second protrusion portion.

In the support structure for a wind power generation device according to the present disclosure, the connecting member may be provided with a member having a shaped steel, a member having a truss structure, or a member having a rigid frame structure between the floats adjacent to each other.

According to this configuration, the connecting member is provided with a member having a shaped steel, a member having a truss structure, or a member having a rigid frame structure, so that the floats adjacent to each other are connected to each other through the connecting member.

In the support structure for a wind power generation device according to the present disclosure, the connecting member and the support member may have an integrated configuration.

According to this configuration, since the connecting member and the support member are integrated, the man-hours in the assembly process at sea can be reduced.

In the support structure for a wind power generation device according to the present disclosure, the float and the connecting member may be fixed to each other by a filling material (31) filled between the float and the connecting member.

According to this configuration, the float and the connecting member are fixed to each other through the filling material filled between the float and the connecting member. The filling material is, for example, grout, mortar or an adhesive.

In the support structure for a wind power generation device according to the present disclosure, in the float and the connecting member, relative displacement that occurs between the float and the connecting member may be attenuated by a rigid body in viscous fluid filled between the float and the connecting member.

According to this configuration, the rigid body in viscous fluid (33) is filled between the float and the connecting member, and the relative displacement that occurs between the float and the connecting member is attenuated by the rigid body in viscous fluid.

In the support structure for a wind power generation device according to the present disclosure, in the support member and the tower part, relative displacement that occurs between the support member and the tower part may be attenuated by a rigid body in viscous fluid filled between the support member and the tower part.

According to this configuration, the rigid body in viscous fluid is filled between the support member and the tower part, and the relative displacement that occurs between the support member and the tower part is attenuated by the rigid body in viscous fluid.

The wind power generation device according to the present disclosure includes the support structure for a wind power generation device described above.

REFERENCE SIGNS LIST 1 wind power generation device
2 tower part
3 wind turbine part
4 foundation part
5 nacelle
6 rotor head
7 blade
8 anchor cable
10 support structure
11 float
11a divided member 11b steel material
12 connecting member
13 support platform
13A plate-shaped member
13B recessed portion
14 wire member
15 support member
16 first annular member
16A first opening portion
17 Long member
21 first protrusion portion
22 second protrusion portion
23 second annular member
23A second opening portion
24 Long member
25 thin steel sheet
26 dividing line
31 filling material
32 shear load transfer member
33 rigid body in viscous fluid
34 projection portion

The invention claimed is:

1. A support structure for a wind power generation device comprising:
 a plurality of floats capable of floating on a water surface or in water;
 a connecting member connected to a first float among the plurality of floats and a second float among the plurality of floats;
 a support platform that is provided in a middle of the plurality of floats and supports a lower end of a tower part of the wind power generation device;
 a linear wire member having one end connected to the first float or the connecting member and the other end connected to the support platform; and
 a support member that is provided at the first float or the connecting member and supports the tower part supported on the support platform from a side such that the tower part is movable in an axial direction of the tower part,
 wherein a second protrusion portion that protrudes in a radial direction is provided on an outer peripheral surface of the first float,
 the connecting member includes a second annular member in which a second opening portion for inserting the first float is formed inside, and
 the connecting member is installed on the first float such that a lower end of the second annular member comes into contact with the second protrusion portion.

2. The support structure for a wind power generation device according to claim 1,
 wherein the support platform supports the lower end of the tower part on a lower side with respect to a lower end of each of the plurality of floats.

3. The support structure for a wind power generation device according to claim 1,
 wherein the support member includes a first annular member in which a first opening portion for inserting the tower part is formed inside, and the tower part is movable in the axial direction in the first opening portion.

4. The support structure for a wind power generation device according to claim 1,
 wherein the support platform includes a first protrusion portion provided to surround the lower end of the tower part.

5. The support structure for a wind power generation device according to claim 1,
 wherein the connecting member is provided with a member having a shaped steel, a member having a truss structure, or a member having a rigid frame structure between the floats adjacent to each other.

6. The support structure for a wind power generation device according to claim 1,
 wherein the connecting member and the support member have an integrated configuration.

7. The support structure for a wind power generation device according to claim 1,
 wherein the first float and the connecting member are fixed to each other by a filling material filled between the first float and the connecting member.

8. The support structure for a wind power generation device according to claim 1,
 wherein in the first float and the connecting member, relative displacement that occurs between the first float and the connecting member is attenuated by a rigid body in viscous fluid filled between the first float and the connecting member.

9. The support structure for a wind power generation device according to claim 1,
 wherein in the support member and the tower part, relative displacement that occurs between the support member and the tower part is attenuated by a rigid body in viscous fluid filled between the support member and the tower part.

10. A wind power generation device comprising:
 the support structure for a wind power generation device according to claim 1.

11. A support structure for a wind power generation device comprising:
 a plurality of floats capable of floating on a water surface or in water;
 a connecting member connected to a first float among the plurality of floats and a second float among the plurality of floats;
 a support platform that is provided in a middle of the plurality of floats and supports a lower end of a tower part of the wind power generation device;
 a linear wire member having one end connected to the first float or the connecting member and the other end connected to the support platform; and
 a support member that is provided at the first float or the connecting member and supports the tower part supported on the support platform from a side such that the tower part is movable in an axial direction of the tower part,
 wherein in the first float and the connecting member, relative displacement that occurs between the first float and the connecting member is attenuated by a rigid body in viscous fluid filled between the first float and the connecting member.

12. A support structure for a wind power generation device comprising:
 a plurality of floats capable of floating on a water surface or in water;
 a connecting member connected to a first float among the plurality of floats and a second float among the plurality of floats;
 a support platform that is provided in a middle of the plurality of floats and supports a lower end of a tower part of the wind power generation device;

a linear wire member having one end connected to the first float or the connecting member and the other end connected to the support platform; and a support member that is provided at the first float or the connecting member and supports the tower part supported on the support platform from a side such that the tower part is movable in an axial direction of the tower part, wherein in the support member and the tower part, relative displacement that occurs between the support member and the tower part is attenuated by a rigid body in viscous fluid filled between the support member and the tower part.

\* \* \* \* \*